United States Patent [19]
Yagi et al.

[11] Patent Number: 5,454,976
[45] Date of Patent: Oct. 3, 1995

[54] FERROELECTRIC LIQUID CRYSTAL COMPOSITION AND LIQUID CRYSTAL DISPLAY DEVICE USING THE SAME

[75] Inventors: Misao Yagi; Hitoshi Kondo; Mika Tadokoro; Hiroko Konuma; Hiroshi Sugiyama; Toshimitsu Hagiwara, all of Tokyo, Japan

[73] Assignee: Takasago International Corporation, Tokyo, Japan

[21] Appl. No.: 237,902

[22] Filed: May 4, 1994

Related U.S. Applicatio Data

[63] Continuation of Ser. No. 780,105, Oct. 21, 1991, abandoned.

[30] Foreign Application Priority Data

Oct. 22, 1990 [JP] Japan .................................. 2-281991
Oct. 22, 1990 [JP] Japan .................................. 2-281992
Oct. 22, 1990 [JP] Japan .................................. 2-281993

[51] Int. Cl.$^6$ .......................... C09K 19/34; C09K 19/20; G02F 1/13
[52] U.S. Cl. .................. 252/299.61; 252/299.67; 252/299.66; 359/103
[58] Field of Search ................. 252/299.61, 299.67, 252/299.66; 359/103

[56] References Cited

U.S. PATENT DOCUMENTS

| | | | |
|---|---|---|---|
| 4,728,458 | 3/1988 | Higuchi et al. | 252/299.65 |
| 4,780,242 | 10/1988 | Miyazawa et al. | 252/299.65 |
| 4,828,754 | 5/1989 | Takehara et al. | 252/299.65 |
| 4,959,173 | 9/1990 | Shibata et al. | 252/299.65 |
| 5,116,527 | 5/1992 | Coates et al. | 252/299.61 |
| 5,120,468 | 6/1992 | Saito et al. | 252/299.61 |
| 5,275,756 | 1/1994 | Yamaguchi et al. | 252/299.61 |

FOREIGN PATENT DOCUMENTS

| | | |
|---|---|---|
| 267585 | 5/1988 | European Pat. Off. |
| 0326086 | 8/1989 | European Pat. Off. |

*Primary Examiner*—Cynthia Harris
*Attorney, Agent, or Firm*—Sughrue, Mion, Zinn, Macpeak & Seas

[57] ABSTRACT

A ferroelectric liquid crystal composition exhibiting a chiral smectic C phase, in which the tilt angle with an electric field applied is from 12° to 18° and the tilt angle during memory is from 8° to 15°, and a liquid crystal display device are disclosed. The composition has high memory effects, high display contrast, and high rate of reponse.

6 Claims, 2 Drawing Sheets

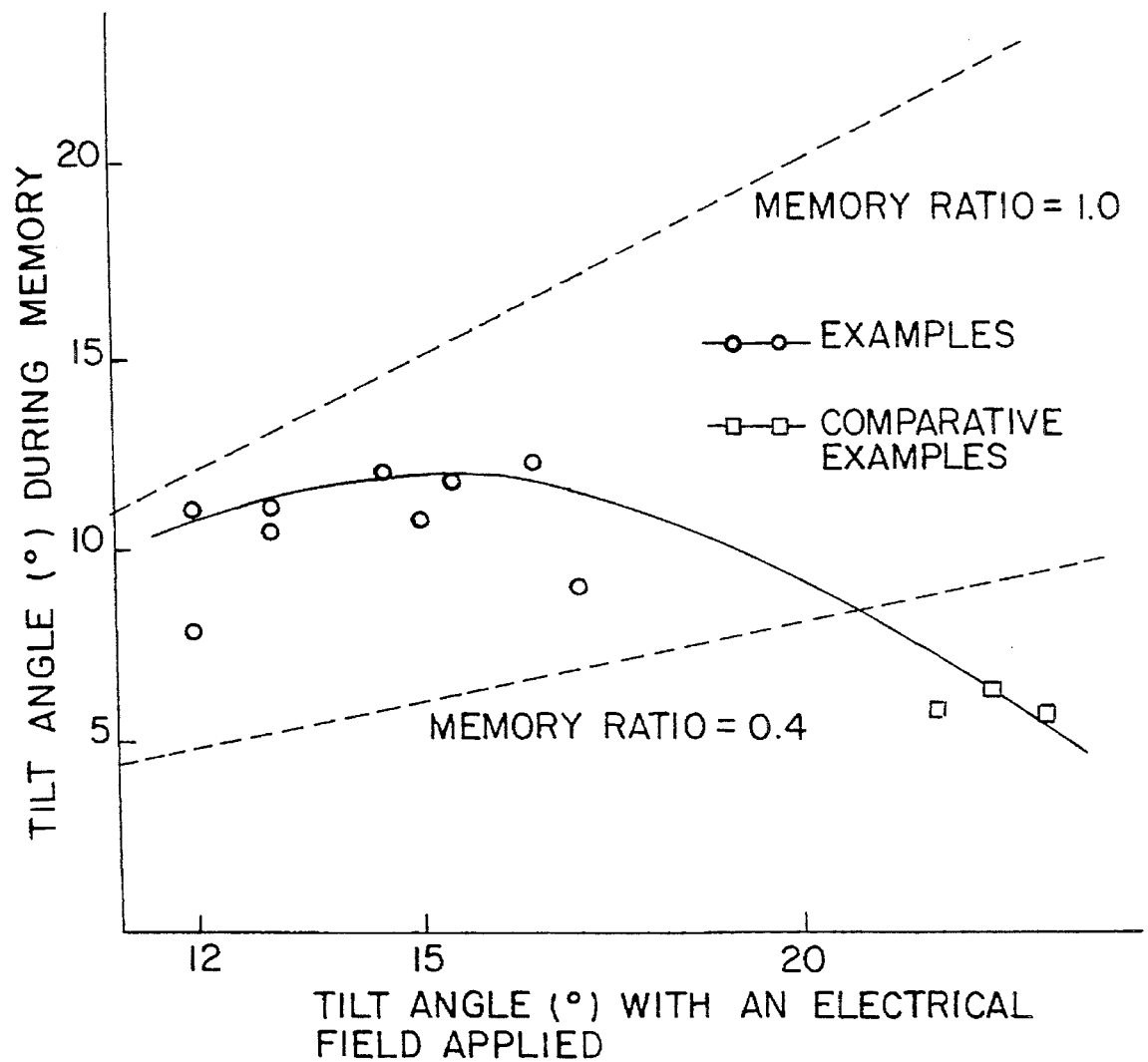

FERROELECTRIC LIQUID CRYSTAL COMPOSITION AND LIQUID CRYSTAL DISPLAY DEVICE USING THE SAME

This is a continuation of application Ser. No. 07/780,105 filed Oct., 21, 1991, now abandoned.

FILED OF THE INVENTION

This invention relates to a ferroelectric liquid crystal composition, and more particularly to a ferroelectric liquid crystal composition having high memory effects, providing high contrast ratio, and having fast response time and thereby useful in devices utilizing electrooptical effects of liquid crystals, such as image displays and optical switching elements, e.g., printer shutter arrays, and to liquid crystal display devices using the same.

BACKGROUND OF THE INVENTION

Liquid crystal displays have been used in various display embodiments such as watches-and desk calculators because of their flatness, lightness, and low electric power consumption. With the recent advancement of integrated circuits (IC), liquid crystal displays have been increasing the display size and extending their use in computers, liquid crystal TV sets, etc. in place of conventional cathode-ray tubes. However, nematic liquid crystals which have conventionally been used have a slow response time of from 10 to 50 milliseconds and undergo a reduction in display contrast according as the number of pixels increases.

In the state-of-the-art liquid crystal displays, the above-described disadvantage is coped with by fitting each pixel with a thin film transistor (TFT) to achieve so-called active matrix driving or by increasing the angle of twist of liquid crystal molecules sandwiched between a pair of substrates to 220° to 270° (super-twisted nematic: STN).

Mounting of TFT according to the former means not only entails very high cost but has a poor yield, resulting in an increased production cost. Cost reduction by introducing a large-scale production line having been studied, there is a limit due to essential involvement of many production steps. Further, ever since the appearance of high-definition televisions (HDTV), there has been an increasing demand of liquid crystal displays making a high-density display. In nature of TFT and nematic liquid crystals, it is nevertheless considered very difficult to increase display density.

On the other hand, although the STN mode exhibits an increased contrast ratio, it has a slower response time of from 100 to 200 milliseconds and is thus limited in application.

It has therefore been keenly demanded to develop a liquid crystal element which achieves high-density displaying at a fast response time. Ferroelectric liquid crystal display elements form the nucleus of such expectations.

Ever since the report of N. A. Clark, et al. on surface-stabilized ferroelectric liquid crystal devices (SSFLCD) (refer to N. A. Clark, et al., *Appl. Phys. Lett.*, Vol. 36, p. 899 (1980)), extensive studies have been directed to ferroelectric liquid crystals with the attention on their fast response. However, ferroelectric liquid crystal display elements have not yet been put to practical use due to problems of response time, molecular orientation, etc. still remaining unsolved. For example, the molecular orientation of ferroelectric liquid crystals proved more complicated than suggested by Clark, et al. That is, the director of liquid crystal molecules is apt to be twisted in smectic layers (spray state), under which a high contrast ratio cannot be obtained. Further, the layers have been believed to be aligned upright and perpendicular to the upper and lower substrates (bookshelf structure) but, in fact, were found to have a bent structure (chevron structure). As a result, zigzag defects appear to reduce a contrast ratio.

With respect to response time, it was believed in the early stage of studies that ferroelectric liquid crystal elements respond in several microseconds. In fact, however, the shortest of the so far reached response time is only several tens of microseconds. It is therefore required to further reduce the response time of ferroelectric liquid crystals for putting them to practical use.

Further, ferroelectric liquid crystals has another problem of low memory effects. That is, the liquid crystal orientation with an alternating electric field applied is readily destroyed after cutting the electric field. On account of this, liquid crystal displays utilizing scanning are accompanied with difficulties in obtaining a high contrast ratio or in greatly increasing the lines of scanning.

Memory effects are observed as a phenomenon resulting from a difference between the angle 2θ (θ: tilt angle with an electric field applied) formed between the first and second optically recognizable stable states appearing on application of an alternating electric field to ferroelectric liquid crystals and the angle 2θ' (θ': tilt angle during memory) formed between the third and fourth stable states appearing on cutting the electric field, the tilt angle during memory being considerably smaller than that with an electric field applied, as illustrated in FIG. 1.

While this phenomenon is deemed attributed to the above-mentioned spray state or chevron structure, etc., many points still remain obscure.

It is theoretically known that the intensity of the light transmitting through ferroelectric liquid crystals reaches the maximum at a tilt angle of 22.5°. It has therefore been attempted to bring the tilt angle during memory close to 22.5° from the aspect of both orientating materials and liquid crystal materials.

As an approach from the aspect of liquid crystal materials, it has been under study to improve memory effects by widening the tilt angle of ferroelectric liquid crystals with an electric field applied over 22.5° thereby to widen the tilt angle during memory.

On the other hand, a tilt angle has great influences on response time in such a manner that too a wide tilt angle results in an increase of response time.

Considering that the shortest response time of ferroelectric liquid crystals reached to date is several tens of microseconds as stated above, widening of the tilt angle leading to an increased response time is of extreme disadvantage.

Accordingly, it has been keenly demanded to develop a ferroelectric liquid crystal composition having high memory effects, providing high contrast displays, and responding at a fast time while being free from the above-mentioned disadvantages associated with conventional ferroelectric liquid crystals and electrooptical elements using them.

SUMMARY OF THE INVENTION

The inventors have conducted extensive investigations to develop a ferroelectric liquid crystal composition which can be driven in a simple matrix system. As a result, they have found that a ferroelectric liquid crystal showing a specific phase in which the tilt angle with an electric field applied and the tilt angle during memory fall within a given range exhibits high memory effects, excellent contrast ratio, and fast response time, thus completing the present invention.

The present invention provides a ferroelectric liquid crystal composition exhibiting a chiral smectic C phase, in which the tilt angle with an electric field applied is from 12° to 18° and the tilt angle during memory is from 8° to 15°.

The present invention also provides a liquid crystal display device using such a ferroelectric liquid crystal composition.

BRIEF DESCRIPTION OF THE DRAWINGS

FIG. 2 is a graph of tilt angle with alternating electric field applied vs. tilt angle during memory.

DETAILED DESCRIPTION OF THE INVENTION

Figure 1:
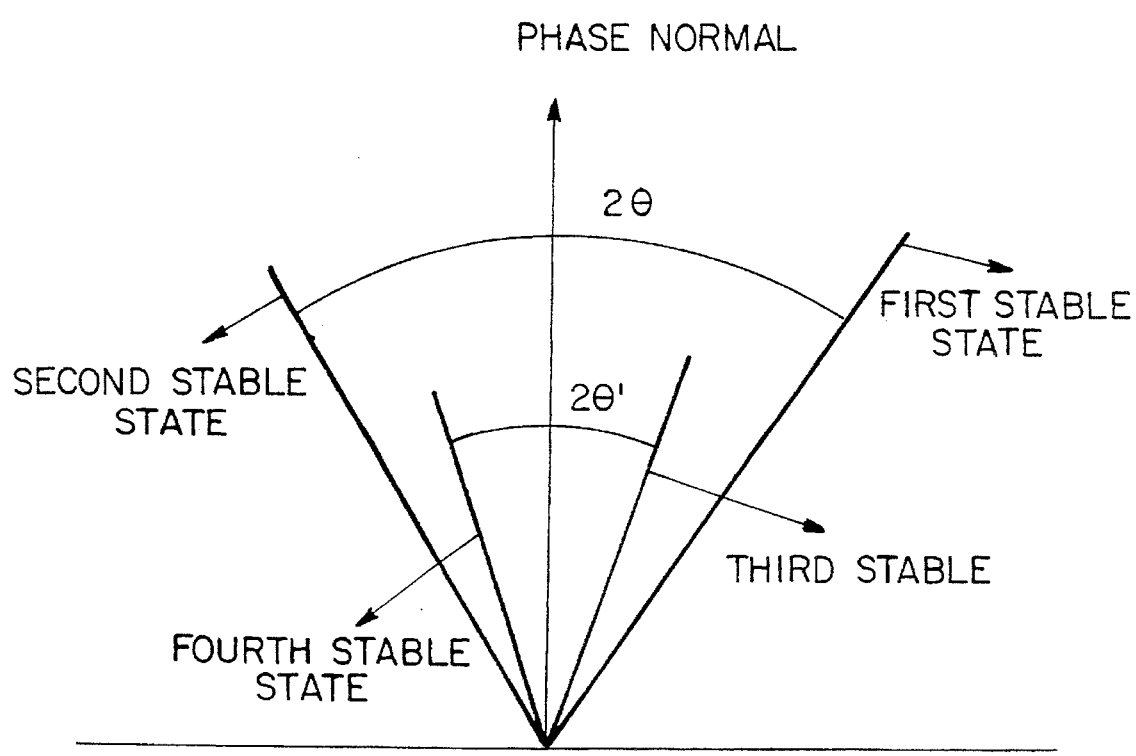
FIG. 1 schematically illustrates the relationship between tilt angle with alternating electric field applied to a ferroelectric liquid crystal and tilt angle during memory appearing on cutting the voltage.

Tilt angle is currently measured by various methods under various conditions and varies depending on the measuring methods or conditions. The tilt angle as referred to in the present invention means a value measured by using a cell of a ferroelectric liquid crystal composition which is composed of a pair of substrates having a transparent electrode and having been subjected to an orientation treatment, assembled at a cell gap of not more than 10 μm, with the longer molecular axis being in parallel with the substrates. In more detail, the term "tilt angle with an electric field applied" is an angle θ, i.e., a half of an angle 2θ formed between two stable states which are optically recognized on application of a sufficient intensity of an alternating electric field to the above-described cell. In other words, the tilt angle with an electric field applied means a tilt angle measured on application of an alternating electric field of sufficient intensity for unwinding the helix formed by the ferroelectric liquid crystal and causing inversion between the first and second stable states of the ferroelectric liquid crystal.

The term "tilt angle during memory" means an angle measured on cutting the alternating electric field under the same conditions as described above, i.e., a half of the angle formed between the third and fourth states stabilized on electric field cutting.

The tilt angle has temperature dependence. That is, it appears on transition from a smectic A phase to a chiral smectic C phase and tends to gradually increase with a drop of temperature but is finally saturated. The term "tilt angle" as used herein means such a saturated tilt angle.

The ferroelectric liquid crystal composition according to the present invention is not limited by its phase sequence as long as it exhibits a chiral smectic C phase and has a tilt angle with an electric field applied ranging from 12° to 18° and a tilt angle during memory ranging from 8° to 15° as measured under the above-described conditions.

Illustrative examples of ferroelectric liquid crystal compositions satisfying the above requirements include those showing a chiral smectic C phase which are prepared from ester type liquid crystals, pyrimidine type liquid crystals, etc. either individually or in combination thereof.

Preferred of such ferroelectric liquid crystal compositions are those containing at least one of liquid crystal compounds represented by formula (I):

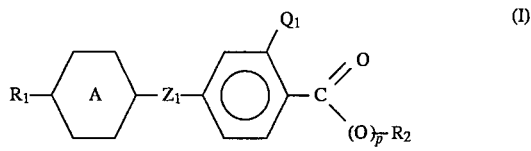

wherein $R_1$ represents a straight chain alkyl or alkoxy group having from 6 to 14 carbon atoms; $R_2$ represents a straight chain or branched alkyl group having from 6 to 14 carbon atoms which may contain an asymmetric carbon atom; ring A represents

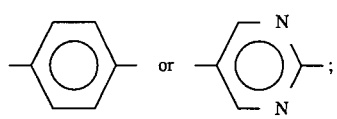

$Z_1$ represents a single bond or —COO—; $Q_1$ represents a hydrogen atom or a fluorine atom; and p represents 1 or 0.

Many of the compounds represented by formula (I) are known and can be synthesized by, for example, the process disclosed in Okano Koji and Kobayashi Shunsuke, *EIKISHO KISOHEN*, pp. 232–251, Baifukan (1985). Other compounds can also be synthesized according to the processes for the known compounds.

Specific examples of the compounds of formula (I) are 4-tetradecyloxyphenylcarboxylic acid 4'-octyloxycarbonylphenyl ester, 4-tetradecyloxyphenylcarboxylic acid 4'-decyloxycarbonylphenyl ester, 4-dodecyloxyphenylcarboxylic acid 3'-fluoro- 4'-hexyloxycarbonylphenyl ester, 4-dodecyloxyphenylcarboxylic acid 3'-fluoro-4'-octyloxycarbonylphenyl ester, 4-decyloxyphenylcarboxylic acid 3'-fluoro-4'-hexylcarbonylphenyl ester, 4-octyloxyphenylcarboxylic acid 4'-hexylcarbonylphenyl ester, 4-octyloxyphenylcarboxylic acid 3'-fluoro-4'-decylcarbonylphenyl ester, 4-decyloxyphenylcarboxylic acid 4'-octylcarbonylphenyl ester; optically active phenyl ester compounds, e.g., compounds represented by formulae:

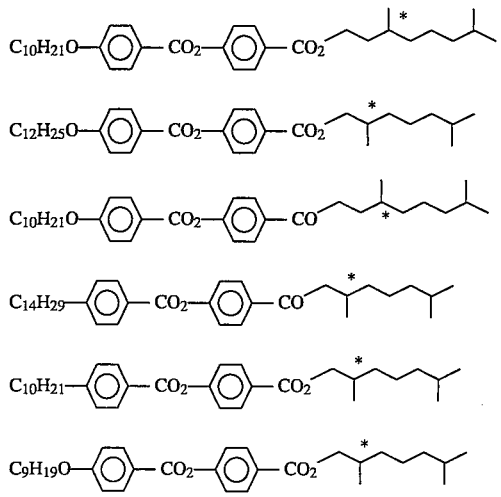

4-decyloxy-4'-octyloxycarbonylbiphenyl, 4-dodecyl-4'-octyloxycarbonylbiphenyl, 4-tetradecyloxy-4,-decylcarbonylbiphenyl, 4-decyl-4'-octylcarbonylbiphenyl; optically active biphenyl compounds, e.g., compounds represented by formulae:

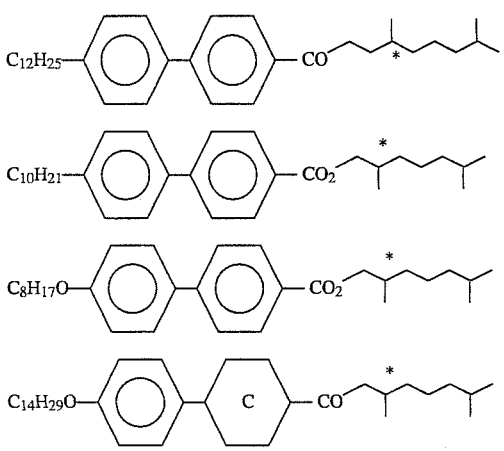

2-(4-octylcarbonyl)phenyl-5-decylpyrimidine, 2-(4-nonyloxycarbonyl)phenyl- 5-dodecylpyrimidine, 2-(4-octyloxycarbonyl)phenyl- 5-dodecyloxypyrimidine, 2-(4-octylcarbonyl)phenyl-5-decyloxypyrimidine; and optically active pyrimidine compounds, e.g., compounds represented by formulae:

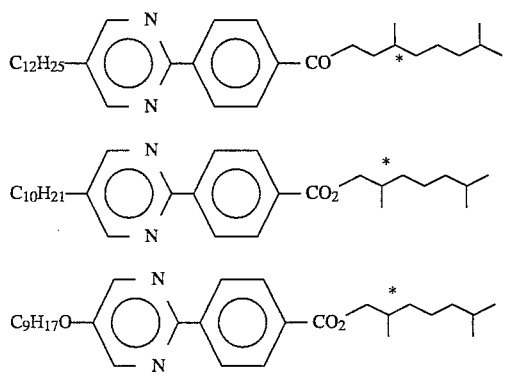

Among them, particularly preferred are 4-dodecyloxyphenylcarboxylic acid 3'-fluoro-4'-octyloxycarbonylphenyl ester, 2-(4-nonyloxycarbonyl)phenyl-5-dodecylpyrimidine, and 2-( 4-octyloxycarbonyl)phenyl-5-dodecyloxypyrimidine.

The ferroelectric liquid crystal composition of the present invention preferably contains, in addition to the compound of formula (I), an optically active compound represented by formula (II) shown below and an achiral liquid crystal compound represented by formula (III) shown below.

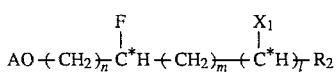

wherein A represents

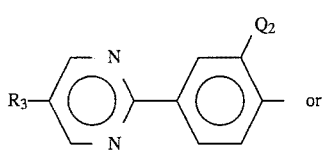

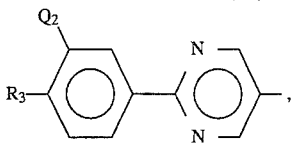

wherein $R_3$ represents a straight chain alkyl group having from 8 to 12 carbon atoms, and $Q_2$ represents a hydrogen atom or a fluorine atom; $R_2$ represents a straight chain alkyl group having from 2 to 8 carbon atoms; $X_1$ represents a fluorine atom or a methyl group; n represents 1 or 2; m represents an integer of from 0 to 3; l represents 0 or 1; and $C^*$ represents an asymmetric carbon atom.

wherein ring B represents

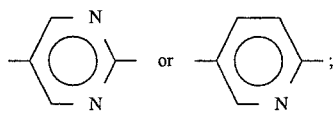

$R_4$ and $R_5$ each represent a straight chain or branched alkyl group having from 6 to 14 carbon atoms; and $Y_1$ and $Z_2$ each represent a single bond or —O—.

The optically active compounds represented by formula (II) are compounds comprising a phenylpyrimidine core and having at least one optically active center due to a fluorine atom. The compounds of formula (II) can be synthesized, for example, through either of processes 1 and 2 described below. Process 1: for compounds of formula (II) wherein l is 0, i.e., those having one asymmetric carbon atom:

Process 1 will be explained with reference to, for instance, a particular compound of formula (IV):

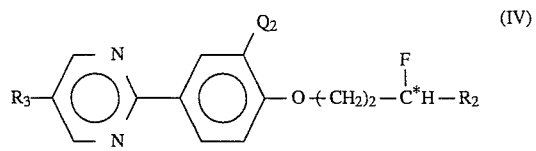

wherein $R_2$, $R_3$, and $Q_2$ are as defined above.

An optically active methyl 3-hydroxyalkanoate is fluorinated with hexafluoropropenediethylamine. This fluorination reaction is known to induce inversion of steric configuration. It has been confirmed that the inversion proceeds nearly 100% without causing racemization.

Thereafter, the fluorinated compound is reduced by using lithium aluminum hydride to obtain a 3-fluoroalkanol, which is then reacted with methanesulfonyl chloride to obtain 3-fluoroheptyl methanesulfonate. The resulting 3-fluoroheptyl methanesulfonate is reacted with a 5-alkyl- or 5-alkoxy-2-(4-hydroxyphenyl)pyrimidine or a 5-alkyl- or 5-alkoxy-2-(3-fluorophenyl- 4-hydroxy)pyrimidine, which is synthesized by known processes described, e.g., in JP-A-61-22072, JP-A-61- 200973, JP-A-63-165344, JP-A-63-253075, and JP-A-64-79160 (the term "JP-A" as used herein means "unexamined published Japanese patent application"), or a 2-(3-fluoro-4-hydroxyphenyl)- 5-(4-alkoxy- or 4-alkyl-phenyl)pyrimidine to obtain the optically active compound of formula (IV). Process 2: for compounds of formula (II) wherein l is 1, i.e., those having two asymmetric carbon atoms:

Process 2 will be explained with reference to, for instance, a particular compound represented by formula (V) or (VI):

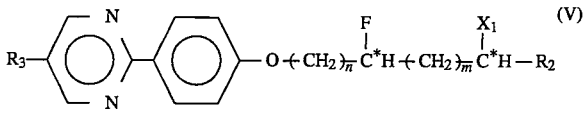

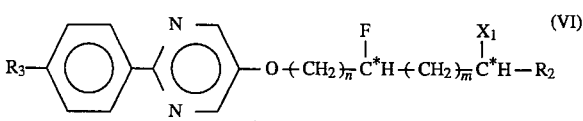

wherein $R_2$, $R_3$, n, m, and $X_1$ are as defined above.

(A) Synthesis of Compounds (V) and (VI) wherein n=1, m=2, and $X_1$=$CH_3$:

An optically active 2-methylalkanol is reacted with p-toluenesulfonyl chloride to obtain a p-toluenesulfonic acid ester. The ester is reacted with lithium bromide to obtain a 2-methylalkyl bromide. The bromide is converted to a Grignard reagent, which is then reacted with optically active glycidyl p-toluenesulfonate to obtain a 2-hydroxy-5-methylalkyl p-toluenesulfonate. The resulting compound is reacted with 3,4-dihydro- 2H-pyran at room temperature to protect the hydroxyl group at the 2-position. The resulting tetrahydropyranyloxy derivative is then reacted with a 2-(4-hydroxyphenyl)-5-alkylpyrimidine or a 2-(4-alkylphenyl)-5-hydroxypyrimidine synthesized by the process disclosed in JP-A-61-22072 and JP-A 2-69467 to synthesize an ether derivative. The protective group is removed with p-toluenesulfonic acid, and the resulting compound is fluorinated with hexafluoropropenediethylamine to obtain the desired compound. The fluorination reaction is known to cause inversion of the steric configuration.

(B) Synthesis of Compounds (V) and (VI) wherein n=1, m=3, and $X_1$=$CH_3$:

The optically active 2-methylalkyl bromide prepared in (A) above is converted to a Grignard reagent, which is then reacted with carbon dioxide gas to obtain a 3-methylalkanoic acid. The acid is reduced with lithium aluminum hydride to obtain a 3-methylalkanol. The alkanol is brominated in the same manner as in (A) and then converted to a Grignard reagent. The Grignard reagent is reacted with optically active glycidyl p-toluenesulfonate to obtain a 2-hydroxy-6-methylalkyl p-toluenesulfonate. The resulting compound is further treated in the same manner as in (A) to obtain the desired compound.

(C) Synthesis of Compounds (V) and (VI) wherein n=1, m=1, and $X_1$=$CH_3$:

Optically active methyl 3-hydroxybutyrate is hydrolyzed to obtain optically active 3-hydroxybutyric acid, which is then reacted with an optically active 2-methylalkanal to obtain a dioxanone derivative in accordance with the process disclosed in D. Seebach, *Angew. Chem. Int. Ed. Engl.,* Vol. 25, No. 2, p. 178 (1986). The dioxanone derivative is treated with trimethylsilyl cyanide and titanium tetrachloride to obtain a β-alkoxycarboxylic acid derivative.

The nitrile group of the resulting compound is oxidized to obtain an acid amide, which is then treated with lithium diisopropylamide to obtain a 2-hydroxy-4-methylalkanoic acid amide. At this point, confirm that the optical purity at the 2-position and the rate of diastereomer excess are both 100%. Then, the hydroxyl group at the 2-position is protected in the same manner as in (A), and the resulting acid amide is hydrolyzed to obtain a carboxylic acid, which is then esterified to obtain a carboxylic acid ester.

The ester compound is reduced with lithium aluminum hydride in the same manner as in (B) to obtain an alkanol derivative, and the compound is reacted with methanesulfonyl chloride to obtain a methanesulfonic acid ester. The ester compound is further treated in the same manner as in (A) to obtain the desired compound.

(D) Synthesis of Compounds (V) and (VI) wherein n=1, m=0, and $X_1$=$CH_3$:

The amino group of an optically active 2-amino-3-methylalkanoic acid is converted to a hydroxyl group via a diazonium salt, and the resulting carboxylic acid is then esterified. The resulting 2-hydroxy-3-methylalkanoic acid ester is reacted with 3,4-dihydro-2H-pyran to protect its hydroxyl group. The resulting tetrahydropyranyl ether compound is reduced with lithium aluminum hydride in the same manner as in (B), and the resulting alcohol is treated in the same manner as in (A) to obtain the desired compound.

(E) Synthesis of Compounds (V) and (VI) wherein n=2, m=1, and $X_1$=F:

The hydroxyl group of an optically active 3-hydroxyalkanoic acid ester is protected with a benzyl group to obtain a benzyloxy compound, which is then reacted with t-butyl acetate in the presence of lithium diisopropylamide to obtain a 5-benzyloxy- 3-oxoalkanoic acid ester. The resulting ester is enantioselectivelly hydrogenated to obtain a 3-hydroxy derivative, which is then fluorinated with hexafluoropropenediethylamine to obtain a 3-fluoro compound. The 3-fluoro compound is hydrogenolyzed in the presence of palladium-on-carbon to obtain a 5-hydroxy-3-fluoro derivative, followed by reduction in the same manner as in (B) to obtain a corresponding alkanol. The alkanol is reacted with methanesulfonyl chloride to obtain a methanesulfonic acid ester. The ester compound is treated in the same manner as in (A) to obtain the desired compound.

(F) Synthesis of Compounds of (V) and (VI) wherein n=2, m=1, and $X_1$=$CH_3$:

A 3-methyl-2-alkenyldiethylamine is enantioselectivelly isomerized to obtain an optically active 3-methylenamine, which is then treated with sulfuric acid to obtain a corresponding aldehyde. The aldehyde compound is oxidized with potassium permanganate to obtain a 3-methylalkanoic acid. The acid is converted to its methyl ester and then treated in the same manner as in (E) to obtain a 5-methyl-3-oxyalkanoic acid ester. The resulting compound is subjected successively to enantioselective hydrogenation, fluorination, and reduction in the same manner as in (E) to obtain a 5-methyl-3-fluoroalkanol. The resulting compound is further treated in the same manner as in (A) to obtain the desired compound.

Specific examples of the optically active compounds of formula (II) are shown below.

(1) Compounds containing two asymmetric carbon atoms, one of which is substituted with a fluorine atom:

2-[4-(2'-Fluoro-3'-methylpentyloxy)phenyl]-5-octylpyrimidine
2-[4-(2'-Fluoro-3'-methylpentyloxy)phenyl]-5-nonylpyrimidine
2-[4-(2'-Fluoro-3'-methylpentyloxy)phenyl]-5-decylpyrimidine
2-[4-(2'-Fluoro-3'-methylpentyloxy)phenyl]-5-undecylpyrimidine
2-[4-(2'-Fluoro-3'-methylpentyloxy)phenyl]-5-dodecylpyrimidine
5-(2'-Fluoro-3'-methylpentyloxy)-2-(4-octylphenyl)pyrimidine
5-(2'-Fluoro-3'-methylpentyloxy)-2-(4-nonylphenyl)pyrimidine
5-(2'-Fluoro-3'-methylpentyloxy)-2-(4-decylphenyl)pyrimidine
5-(2'-Fluoro-3'-methylpentyloxy)-2-(4-undecylphenyl)pyrimidine
5-(2'-Fluoro-3'-methylpentyloxy)-2-(4-dodecylphenyl)pyrimidine
2-[4-(2'-Fluoro-3'-methylhexyloxy)phenyl]-5-octylpyrimidine
2-[4-(2'-Fluoro-3'-methylhexyloxy)phenyl]-5-nonylpyrimidine
2-[4-(2'-Fluoro-3'-methylhexyloxy)phenyl]-5-decylpyrimidine
2-[4-(2'-Fluoro-3'-methylhexyloxy)phenyl]-5-undecylpyrimidine
2-[4-(2'-Fluoro-3'-methylhexyloxy)phenyl]-5-dodecylpyrimidine
5-(2'-Fluoro-3'-methylhexyloxy)-2-(4-octylphenyl)pyrimidine
5-(2'-Fluoro-3'-methylhexyloxy)-2-(4-nonylphenyl)pyrimidine
5-(2'-Fluoro-3'-methylhexyloxy)-2-(4-decylphenyl)pyrimidine
5-(2'-Fluoro-3'-methylhexyloxy)-2-(4-undecylphenyl)pyrimidine
5-(2'-Fluoro-3'-methylhexyloxy)-2-(4-dodecylphenyl)pyrimidine
2-[4-(2'-Fluoro-3'-methylheptyloxy)phenyl]-5-octylpyrimidine
2-[4-(2'-Fluoro-3'-methylheptyloxy)phenyl]-5-nonylpyrimidine
2-[4-(2'-Fluoro-3'-methylheptyloxy)phenyl]-5-decylpyrimidine
2-[4-(2'-Fluoro-3'-methylheptyloxy)phenyl]-5-undecylpyrimidine
2-[4-(2'-Fluoro-3'-methylheptyloxy)phenyl]-5-dodecylpyrimidine
5-(2'-Fluoro-3'-methylheptyloxy)-2-(4-octylphenyl)pyrimidine
5-(2'-Fluoro-3'-methylheptyloxy)-2-(4-nonylphenyl)pyrimidine
5-(2'-Fluoro-3'-methylheptyloxy)-2-(4-decylphenyl)pyrimidine
5-(2'-Fluoro-3'-methylheptyloxy)-2-(4-undecylphenyl)pyrimidine
5-(2'-Fluoro-3'-methylheptyloxy)-2-(4-dodecylphenyl)pyrimidine
2-[4-(2'-Fluoro-3'-methyloctyloxy)phenyl]-5-octylpyrimidine
2-[4-(2'-Fluoro-3'-methyloctyloxy)phenyl]-5-nonylpyrimidine
2-[4-(2'-Fluoro-3'-methyloctyloxy)phenyl]-5-decylpyrimidine
2-[4-(2'-Fluoro-3'-methyloctyloxy)phenyl]-5-undecylpyrimidine
2-[4-(2'-Fluoro-3'-methyloctyloxy)phenyl]-5-dodecylpyrimidine
5-(2'-Fluoro-3'-methyloctyloxy)-2-(4-octylphenyl)pyrimidine
5-(2'-Fluoro-3'-methyloctyloxy)-2-(4-nonylphenyl)pyrimidine
5-(2'-Fluoro-3'-methyloctyloxy)-2-(4-decylphenyl)pyrimidine
5-(2'-Fluoro-3'-methyloctyloxy)-2-(4-undecylphenyl)pyrimidine
2-(2'-Fluoro-3'-methyloctyloxy)-2-(4-dodecylphenyl)pyrimidine
2-[4-(2'-Fluoro-4'-methylhexyloxy)phenyl]-5-octylpyrimidine
2-[4-(2'-Fluoro-4'-methylhexyloxy)phenyl]-5-nonylpyrimidine
2-[4-(2'-Fluoro-4'-methylhexyloxy)phenyl]-5-decylpyrimidine
2-[4-(2'-Fluoro-4'-methylhexyloxy)phenyl]-5-undecylpyrimidine
2-[4-(2'-Fluoro-4'-methylhexyloxy)phenyl]-5-dodecylpyrimidine
5-(2'-Fluoro-4'-methylhexyloxy)-2-(4-octylphenyl)pyrimidine
5-(2'-Fluoro-4'-methylhexyloxy)-2-(4-nonylphenyl)pyrimidine
5-(2'-Fluoro-4'-methylhexyloxy)-2-(4-decylphenyl)pyrimidine
5-(2'-Fluoro-4'-methylhexyloxy)-2-(4-undecylphenyl)pyrimidine
5-(2'-Fluoro-4'-methylhexyloxy)-2-(4-dodecylphenyl)pyrimidine
2-[4-(2'-Fluoro-4'-methylheptyloxy)phenyl]-5-octylpyrimidine
2-[4-(2'-Fluoro-4'-methylheptyloxy)phenyl]-5-nonylpyrimidine
2-[4-(2'-Fluoro-4'-methylheptyloxy)phenyl]-5-decylpyrimidine
2-[4-(2'-Fluoro-4'-methylheptyloxy)phenyl]-5-undecylpyrimidine
2-[4-(2'-Fluoro-4'-methylheptyloxy)phenyl]-5-dodecylpyrimidine
5-(2'-Fluoro-4'-methylheptyloxy)-2-(4-octylphenyl)pyrimidine
5-(2'-Fluoro-4'-methylheptyloxy)-2-(4-nonylphenyl)pyrimidine
5-(2'-Fluoro-4'-methylheptyloxy)-2-(4-decylphenyl)pyrimidine
5-(2'-Fluoro-4'-methylheptyloxy)-2-(4-undecylphenyl)pyrimidine
5-(2'-Fluoro-4'-methylheptyloxy)-2-(4-dodecylphenyl)pyrimidine
2-[4-(2'-Fluoro-4'-methyloctyloxy)phenyl]-5-octylpyrimidine 2-[4-(2'-Fluoro-4'-methyloctyloxy)phenyl]-5-nonylpyrimidine
2-[4-(2'-Fluoro-4'-methyloctyloxy)phenyl]-5-decylpyrimidine
2-[4-(2'-Fluoro-4'-methyloctyloxy)phenyl]-5-undecylpyrimidine
2-[4-(2'-Fluoro-4'-methyloctyloxy)phenyl]-5-dodecylpyrimidine
5-(2'-Fluoro-4'-methyloctyloxy)-2-(4-octylphenyl)pyrimidine
5-(2'-Fluoro-4'-methyloctyloxy)-2-(4-nonylphenyl)pyrimidine
5-(2'-Fluoro-4'-methyloctyloxy)-2-(4-decylphenyl)pyrimidine
5-(2'-Fluoro-4'-methyloctyloxy)-2-(4-undecylphenyl)pyrimidine
5-(2'-Fluoro-4'-methyloctyloxy)-2-(4-dodecylphenyl)pyrimidine
2-[4-(2'-Fluoro-4'-methylnonyloxy)phenyl]-5-octylpyrimidine
2-[4-(2'-Fluoro-4'-methylnonyloxy)phenyl]-5-nonylpyrimidine
2-[4-(2'-Fluoro-4'-methylnonyloxy)phenyl]-5-decylpyrimidine
2-[4-(2'-Fluoro-4'-methylnonyloxy)phenyl]-5-undecylpyrimidine
2-[4-(2'-Fluoro-4'-methyinonyloxy)phenyl]-5-dodecylpyrimidine
5-(2'-Fluoro-4'-methylnonyloxy)-2-(4-octylphenyl)pyrimidine
5-(2'-Fluoro-4'-methylnonyloxy)-2-(4-nonylphenyl)pyrimidine
5-(2'-Fluoro-4'-methylnonyloxy)-2-(4-decylphenyl)pyrimidine
5-(2'-Fluoro-4'-methylnonyloxy)-2-(4-undecylphenyl)pyrimidine
5-(2'-Fluoro-4'-methylnonyloxy)-2-(4-dodecylphenyl)pyrimidine
2-[4-(2'-Fluoro-5'-methylheptyloxy)phenyl]-5-octylpyrimidine
2-[4-(2'-Fluoro-5'-methylheptyloxy)phenyl]-5-nonylpyrimidine
2-[4-(2'-Fluoro-5'-methylheptyloxy)phenyl]-5-decylpyrimidine
2-[4-(2'-Fluoro-5'-methylheptyloxy)phenyl]-5-undecylpyrimidine
2-[4-(2'-Fluoro-5'-methylheptyloxy)phenyl]-5-dodecylpyrimidine
5-(2'-Fluoro-5'-methylheptyloxy)-2-(4-octylphenyl)pyrimidine
5-(2'-Fluoro-5'-methylheptyloxy)-2-(4-nonylphenyl)pyrimidine
5-(2'-Fluoro-5'-methylheptyloxy)-2-(4-decylphenyl)pyrimidine
5-(2'-Fluoro-5'-methylheptyloxy)-2-(4-undecylphenyl)pyrimidine
5-(2'-Fluoro-5'-methylheptyloxy)-2-(4-dodecylphenyl)pyrimidine
2-[4-(2'-Fluoro-5'-methyloctyloxy)phenyl]-5-octylpyrimidine
2-[4-(2'-Fluoro-5'-methyloctyloxy)phenyl]-5-nonylpyrimidine
2-[4-(2'-Fluoro-5'-methyloctyloxy)phenyl]-5-decylpyrimidine
2-[4-(2'-Fluoro-5'-methyloctyloxy)phenyl]-5-undecylpyrimidine
2-[4-(2'-Fluoro-5'-methyloctyloxy)phenyl]-5-dodecylpyrimidine
5-(2'-Fluoro-5'-methyloctyloxy)-2-(4-octylphenyl)pyrimidine
5-(2'-Fluoro-5'-methyloctyloxy)-2-(4-nonylphenyl)pyrimidine
5-(2'-Fluoro-5'-methyloctyloxy)-2-(4-decylphenyl)pyrimidine
5-(2'-Fluoro-5'-methyloctyloxy)-2-(4-undecylphenyl)pyrimidine
5-(2'-Fluoro-5'-methyloctyloxy)-2-(4-dodecylphenyl)pyrimidine
2-[4-(2'-Fluoro-5'-methylnonyloxy)phenyl]-5-octylpyrimidine
2-[4-(2'-Fluoro-5'-methylnonyloxy) phenyl]-5-nonylpyrimidine
2-[4-(2'-Fluoro-5'-methylnonyloxy)phenyl]-5-decylpyrimidine
2-[4-(2'-Fluoro-5'-methylnonyloxy)phenyl]-5-undecylpyrimidine
2-[4-(2'-Fluoro-5'-methylnonyloxy)phenyl]-5-dodecylpyrimidine
5-(2'-Fluoro-5'-methylnonyloxy)-2-(4-octylphenyl)pyrimidine
5-(2'-Fluoro-5'-methylnonyloxy)-2-(4-nonylphenyl)pyrimidine
5-(2'-Fluoro-5'-methylnonyloxy)-2-(4-decylphenyl)pyrimidine
5-(2'-Fluoro-5'-methylnonyloxy)-2-(4-undecylphenyl)pyrimidine
5-(2'-Fluoro-5'-methylnonyloxy)-2-(4-dodecylphenyl)pyrimidine
2-[4-(2'-Fluoro-5'-methyldecyloxy)phenyl]-5-octylpyrimidine
2-[4-(2'-Fluoro-5'-methyldecyloxy)phenyl]-5-nonylpyrimidine
2-[4-(2'-Fluoro-5'-methyldecyloxy)phenyl]-5-decylpyrimidine
2-[4-(2'-Fluoro-5'-methyldecyloxy)phenyl]-5-undecylpyrimidine
2-[4-(2'-Fluoro-5'-methyldecyloxy)phenyl]-5-dodecylpyrimidine
5-(2'-Fluoro-5'-methyldecyloxy)-2-(4-octylphenyl)pyrimidine
5-(2'-Fluoro-5'-methyldecyloxy)-2-(4-nonylphenyl)pyrimidine
5-(2'-Fluoro-5'-methyldecyloxy)-2-(4-decylphenyl)pyrimidine
5-(2'-Fluoro-5'-methyldecyloxy)-2-(4-undecylphenyl)pyrimidine
5-(2'-Fluoro-5'-methyldecyloxy)-2-(4-dodecylphenyl)pyrimidine
2-[4-(2'-Fluoro-6'-methyloctyloxy)phenyl]-5-octylpyrimidine
2-[4-(2'-Fluoro-6'-methyloctyloxy)phenyl]-5-nonylpyrimidine
2-[4-(2'-Fluoro-6'-methyloctyloxy)phenyl]-5-decylpyrimidine 2-[4-(2'-Fluoro-6'-methyloctyloxy)phenyl]-5-undecylpyrimidine
2-[4-(2'-Fluoro-6'-methyloctyloxy)phenyl]-5-dodecylpyrimidine
5-(2'-Fluoro-6'-methyloctyloxy)-2-(4-octylphenyl)pyrimidine
5-(2'-Fluoro-6'-methyloctyloxy)-2-(4-nonylphenyl)pyrimidine
5-(2'-Fluoro-6'-methyloctyloxy)-2-(4-decylphenyl)pyrimidine
5-(2'-Fluoro-6'-methyloctyloxy)-2-(4-undecylphenyl)pyrimidine
5-(2'-Fluoro-6'-methyloctyloxy)-2-(4-dodecylphenyl)pyrimidine
2-[4-(2'-Fluoro-6'-methylnonyloxy)phenyl]-5-octylpyrimidine
2-[4-(2'-Fluoro-6'-methylnonyloxy)phenyl]-5-nonylpyrimidine
2-[4-(2'-Fluoro-6'-methylnonyloxy)phenyl]-5-decylpyrimidine
2-[4-(2'-Fluoro-6'-methylnonyloxy)phenyl]-5-undecylpyrimidine
2-[4-(2'-Fluoro-6'-methylnonyloxy)phenyl]-5-dodecylpyrimidine
5-(2'-Fluoro-6'-methylnonyloxy)-2-(4-octylphenyl)pyrimidine
5-(2'-Fluoro-6'-methylnonyloxy)-2-(4-nonylphenyl)pyrimidine
5-(2'-Fluoro-6'-methylnonyloxy)-2-(4-decylphenyl)pyrimidine
5-(2'-Fluoro-6'-methylnonyloxy)-2-(4-undecylphenyl)pyrimidine
5-(2'-Fluoro-6'-methylnonyloxy)-2-(4-dodecylphenyl)pyrimidine
2-[4-(2'-Fluoro-6'-methyldecyloxy)phenyl]-5-octylpyrimidine
2-[4-(2'-Fluoro-6'-methyldecyloxy)phenyl]-5-nonylpyrimidine
2-[4-(2'-Fluoro-6'-methyldecyloxy)phenyl]-5-decylpyrimidine
2-[4-(2'-Fluoro-6'-methyldecyloxy)phenyl]-5-undecylpyrimidine
2-[4-(2'-Fluoro-6'-methyldecyloxy)phenyl]-5-dodecylpyrimidine
5-(2'-Fluoro-6'-methyldecyloxy)-2-(4-octylphenyl)pyrimidine
5-(2'-Fluoro-6'-methyldecyloxy)-2-(4-nonylphenyl)pyrimidine
5-(2'-Fluoro-6'-methyldecyloxy)-2-(4-decylphenyl)pyrimidine
5-(2'-Fluoro-6'-methyldecyloxy)-2-(4-undecylphenyl)pyrimidine
5-(2'-Fluoro-6'-methyldecyloxy)-2-(4-dodecylphenyl)pyrimidine
2-[4-(2'-Fluoro-6'-methylundecyloxy)phenyl]-5-octylpyrimidine
2-[4-(2'-Fluoro-6'-methylundecyloxy)phenyl]-5-nonylpyrimidine
2-[4-(2'-Fluoro-6'-methylundecyloxy)phenyl]-5-decylpyrimidine
2-[4-(2'-Fluoro-6'-methylundecyloxy)phenyl]-5-undecylpyrimidine
2-[4-(2'-Fluoro-6'-methylundecyloxy)phenyl]-5-dodecylpyrimidine
5-(2'-Fluoro-6'-methylundecyloxy)-2-(4-octylphenyl)pyrimidine
5-(2'-Fluoro-6'-methylundecyloxy)-2-(4-nonylphenyl)pyrimidine
5-(2'-Fluoro-6'-methylundecyloxy)-2-(4-decylphenyl)pyrimidine
5-(2'-Fluoro-6'-methylundecyloxy)-2-(4-undecylphenyl)pyrimidine
5-(2'-Fluoro-6'-methylundecyloxy)-2-(4-dodecylphenyl)pyrimidine
2-[4-(3'-Fluoro-4'-methylhexyloxy)phenyl]-5-octylpyrimidine
2-[4-(3'-Fluoro-4'-methylhexyloxy)phenyl]-5-nonylpyrimidine
2-[4-(3'-Fluoro-4'-methylhexyloxy)phenyl]-5-decylpyrimidine
2-[4-(3'-Fluoro-4'-methylhexyloxy)phenyl]-5-undecylpyrimidine
2-[4-(3'-Fluoro-4'-methylhexyloxy)phenyl]-5-dodecylpyrimidine
5-(3'-Fluoro-4'-methylhexyloxy)-2-(4-octylphenyl)pyrimidine
5-(3'-Fluoro-4'-methylhexyloxy)-2-(4-nonylphenyl)pyrimidine
5-(3'-Fluoro-4'-methylhexyloxy)-2-(4-decylphenyl)pyrimidine
5-(3'-Fluoro-4'-methylhexyloxy)-2-(4-undecylphenyl)pyrimidine
5-(3'-Fluoro-4'-methylhexyloxy)-2-(4-dodecylphenyl)pyrimidine
2-[4-(3'-Fluoro-4'-methylheptyloxy)phenyl]-5-octylpyrimidine
2-[4-(3'-Fluoro-4'-methylheptyloxy)phenyl]-5-nonylpyrimidine
2-[4-(3'-Fluoro-4'-methylheptyloxy)phenyl]-5-decylpyrimidine
2-[4-(3'-Fluoro-4'-methylheptyloxy)phenyl]-5-undecylpyrimidine
2-[4-(3'-Fluoro-4'-methylheptyloxy)phenyl]-5-dodecylpyrimidine
5-(3'-Fluoro-4'-methylheptyloxy)-2-(4-octylphenyl)pyrimidine
5-(3'-Fluoro-4'-methylheptyloxy)-2-(4-nonylphenyl)pyrimidine
5-(3'-Fluoro-4'-methylheptyloxy)-2-(4-decylphenyl)pyrimidine
5-(3'-Fluoro-4'-methylheptyloxy)-2-(4-undecylphenyl)pyrimidine
5-(3'-Fluoro-4'-methylheptyloxy)-2-(4-dodecylphenyl)pyrimidine
2-[4-(3'-Fluoro-4'-methyloctyloxy)phenyl]-5-octylpyrimidine
2-[4-(3'-Fluoro-4'-methyloctyloxy)phenyl]-5-nonylpyrimidine
2-[4-(3'-Fluoro-4'-methyloctyloxy)phenyl]-5-decylpyrimidine
2-[4-(3'-Fluoro-4'-methyloctyloxy)phenyl]-5-undecylpyrimidine
2-[4-(3'-Fluoro-4'-methyloctyloxy)phenyl]-5-dodecylpyrimidine 5-(3'-Fluoro-4'-methyloctyloxy)-2-(4-octylphenyl)pyrimidine
5-(3'-Fluoro-4'-methyloctyloxy)-2-(4-nonylphenyl)pyrimidine
5-(3'-Fluoro-4'-methyloctyloxy)-2-(4-decylphenyl)pyrimidine
5-(3'-Fluoro-4'-methyloctyloxy)-2-(4-undecylphenyl)pyrimidine
5-(3'-Fluoro-4'-methyloctyloxy)-2-(4-dodecylphenyl)pyrimidine
2-[4-(3'-Fluoro-4'-methylnonyloxy)phenyl]-5-octylpyrimidine
2-[4-(3'-Fluoro-4'-methylnonyloxy)phenyl]-5-nonylpyrimidine
2-[4-(3'-Fluoro-4'-methylnonyloxy)phenyl]-5-decylpyrimidine
2-[4-(3'-Fluoro-4'-methylnonyloxy)phenyl]-5-undecylpyrimidine
2-[4-(3'-Fluoro-4'-methylnonyloxy)phenyl]-5-dodecylpyrimidine
5-(3'-Fluoro-4'-methylnonyloxy)-2-(4-octylphenyl)pyrimidine
5-(3'-Fluoro-4'-methylnonyloxy)-2-(4-nonylphenyl)pyrimidine
5-(3'-Fluoro-4'-methylnonyloxy)-2-(4-decylphenyl)pyrimidine
5-(3'-Fluoro-4'-methylnonyloxy)-2-(4-undecylphenyl)pyrimidine
5-(3'-Fluoro-4'-methylnonyloxy)-2-(4-dodecylphenyl)pyrimidine
2-[4-(3'-Fluoro-5'-methylheptyloxy)phenyl]-5-octylpyrimidine
2-[4-(3'-Fluoro-5'-methylheptyloxy)phenyl]-5-nonylpyrimidine
2-[4-(3'-Fluoro-5'-methylheptyloxy)phenyl]-5-decylpyrimidine
2-[4-(3'-Fluoro-5'-methylheptyloxy)phenyl]-5-undecylpyrimidine
2-[4-(3'-Fluoro-5'-methylheptyloxy)phenyl]-5-dodecylpyrimidine
5-(3'-Fluoro-5'-methylheptyloxy)-2-(4-octylphenyl)pyrimidine
5-(3'-Fluoro-5'-methylheptyloxy)-2-(4-nonylphenyl)pyrimidine
5-(3'-Fluoro-5'-methylheptyloxy)-2-(4-decylphenyl)pyrimidine
5-(3'-Fluoro-5'-methylheptyloxy)-2-(4-undecylphenyl)pyrimidine
5-(3'-Fluoro-5'-methylheptyloxy)-2-(4-dodecylphenyl)pyrimidine
2-[4-(3'-Fluoro-5'-methyloctyloxy) phenyl]-5-octylpyrimidine
2-[4-(3'-Fluoro-5 '-methyloctyloxy) phenyl]-5-nonylpyrimidine
2-[4-(3'-Fluoro-5 '-methyloctyloxy) phenyl]-5-decylpyrimidine
2-[4-(3'-Fluoro-5'-methyloctyloxy) phenyl]-5-undecylpyrimidine
2-[4-(3'-Fluoro-5'-methyloctyloxy)phenyl]-5-dodecylpyrimidine
5-(3'-Fluoro-5'-methyloctyloxy)-2-(4-octylphenyl)pyrimidine
5-(3'-Fluoro-5'-methyloctyloxy)-2-(4-nonylphenyl)pyrimidine
5-(3'-Fluoro-5'-methyloctyloxy)-2-(4-decylphenyl)pyrimidine
5-(3'-Fluoro-5'-methyloctyloxy)-2-(4-undecylphenyl)pyrimidine
5-(3'-Fluoro-5'-methyloctyloxy)-2-(4-dodecylphenyl)pyrimidine
2-[4-(3'-Fluoro-5'-methylnonyloxy)phenyl]-5-octylpyrimidine
2-[4-(3'-Fluoro-5'-methylnonyloxy)phenyl]-5-nonylpyrimidine
2-[4-(3'-Fluoro-5'-methylnonyloxy)phenyl]-5-decylpyrimidine
2-[4-(3'-Fluoro-5'-methylnonyloxy)phenyl]-5-undecylpyrimidine
2-[4-(3'-Fluoro-5'-methylnonyloxy)phenyl]-5-dodecylpyrimidine
5-(3'-Fluoro-5'-methylnonyloxy)-2-(4-octylphenyl)pyrimidine
5-(3'-Fluoro-5'-methylnonyloxy)-2-(4-nonylphenyl)pyrimidine
5-(3'-Fluoro-5'-methylnonyloxy)-2-(4-decylphenyl)pyrimidine
5-(3'-Fluoro-5'-methylnonyloxy)-2-(4-undecylphenyl)pyrimidine
5-(3'-Fluoro-5'-methylnonyloxy)-2-(4-dodecylphenyl)pyrimidine
2-[4-(3'-Fluoro-5'-methyldecyloxy)phenyl]-5-octylpyrimidine
2-[4-(3'-Fluoro-5 '-methyldecyloxy)phenyl]-5-nonylpyrimidine
2-[4-(3'-Fluoro-5'-methyldecyloxy)phenyl]-5-decylpyrimidine
2-[4-(3'-Fluoro-5'-methyldecyloxy)phenyl]-5-undecylpyrimidine
2-[4-(3'-Fluoro-5 '-methyldecyloxy)phenyl]-5-dodecylpyrimidine
5-(3'-Fluoro-5'-methyldecyloxy)-2-(4-octylphenyl)pyrimidine
5-(3'-Fluoro-5'-methyldecyloxy)-2-(4-nonylphenyl)pyrimidine
5-(3'-Fluoro-5'-methyldecyloxy)-2-(4-decylphenyl)pyrimidine
5-(3'-Fluoro-5'-methyldecyloxy)-2-(4-undecylphenyl)pyrimidine
5-(3'-Fluoro-5'-methyldecyloxy)-2-(4-dodecylphenyl)pyrimidine
2-[4-(3'-Fluoro-6'-methyloctyloxy)phenyl]-5-octylpyrimidine
2-[4-(3'-Fluoro-6'-methyloctyloxy)phenyl]-5-nonylpyrimidine
2-[4-(3'-Fluoro-6'-methyloctyloxy)phenyl]-5-decylpyrimidine
2-[4-(3,-Fluoro-6'-methyloctyloxy)phenyl]-5-undecylpyrimidine
2-[4-(3'-Fluoro-6'-methyloctyloxy)phenyl]-5-dodecylpyrimidine
5-(3'-Fluoro-6'-methyloctyloxy)-2-(4-octylphenyl)pyrimidine
5-(3'-Fluoro-6'-methyloctyloxy)-2-(4-nonylphenyl)pyrimidine 5-(3'-Fluoro-6'-methyloctyloxy)-2-(4-decylphenyl)pyrimidine
5-(3'-Fluoro-6'-methyloctyloxy)-2-(4-undecylphenyl)pyrimidine
5-(3'-Fluoro-6'-methyloctyloxy)-2-(4-dodecylphenyl)pyrimidine
2-[4-(3'-Fluoro-6'-methylnonyloxy)phenyl]-5-octylpyrimidine
2-[4-(3'-Fluoro-6'-methylnonyloxy)phenyl]-5-nonylpyrimidine
2-[4-(3'-Fluoro-6'-methylnonyloxy)phenyl]-5-decylpyrimidine
2-[4-(3'-Fluoro-6'-methylnonyloxy)phenyl]-5-undecylpyrimidine
2-[4-(3'-Fluoro-6'-methylnonyloxy)phenyl]-5-dodecylpyrimidine
5-(3'-Fluoro-6'-methylnonyloxy)-2-(4-octylphenyl)pyrimidine
5-(3'-Fluoro-6'-methylnonyloxy)-2-(4-nonylphenyl)pyrimidine
5-(3'-Fluoro-6'-methylnonyloxy)-2-(4-decylphenyl)pyrimidine
5-(3'-Fluoro-6'-methylnonyloxy)-2-(4-undecylphenyl)pyrimidine
5-(3'-Fluoro-6'-methylnonyloxy)-2-(4-dodecylphenyl)pyrimidine
2-[4-(3'-Fluoro-6'-methyldecyloxy)phenyl]-5-octylpyrimidine
2-[4-(3'-Fluoro-6'-methyldecyloxy)phenyl]-5-nonylpyrimidine
2-[4-(3'-Fluoro-6'-methyldecyloxy)phenyl]-5-decylpyrimidine
2-[4-(3'-Fluoro-6'-methyldecyloxy)phenyl]-5-undecylpyrimidine
2-[4-(3'-Fluoro-6'-methyldecyloxy)phenyl]-5-dodecylpyrimidine
5-(3'-Fluoro-6'-methyldecyloxy)-2-(4-octylphenyl)pyrimidine
5-(3'-Fluoro-6'-methyldecyloxy)-2-(4-nonylphenyl)pyrimidine
5-(3'-Fluoro-6'-methyldecyloxy)-2-(4-decylphenyl)pyrimidine
5-(3'-Fluoro-6'-methyldecyloxy)-2-(4-undecylphenyl)pyrimidine
5-(3'-Fluoro-6'-methyldecyloxy)-2-(4-dodecylphenyl)pyrimidine
2-[4-(3'-Fluoro-6'-methylundecyloxy)phenyl]-5-octylpyrimidine
2-[4-(3'-Fluoro-6'-methylundecyloxy)phenyl]-5-nonylpyrimidine
2-[4-(3'-Fluoro-6'-methylundecyloxy)phenyl]-5-decylpyrimidine
2-[4-(3'-Fluoro-6'-methylundecyloxy)phenyl]-5-undecylpyrimidine
2-[4-(3'-Fluoro-6'-methylundecyloxy)phenyl]-5-dodecylpyrimidine
5-(3'-Fluoro-6'-methylundecyloxy)-2-(4-octylphenyl)pyrimidine
5-(3'-Fluoro-6'-methylundecyloxy)-2-(4-nonylphenyl)pyrimidine
5-(3'-Fluoro-6'-methylundecyloxy)-2-(4-decylphenyl)pyrimidine
5-(3'-Fluoro-6'-methylundecyloxy)-2-(4-undecylphenyl)pyrimidine
5-(3'-Fluoro-6'-methylundecyloxy)-2-(4-dodecylphenyl)pyrimidine
5-[4-(3'-Fluoro-7'-methylnonyloxy)phenyl]-5-octylpyrimidine
2-[4-(3'-Fluoro-7'-methylnonyloxy)phenyl]-5-nonylpyrimidine
2-[4-(3'-Fluoro-7'-methylnonyloxy)phenyl]-5-decylpyrimidine
2-[4-(3'-Fluoro-7'-methylnonyloxy)phenyl]-5-undecylpyrimidine
2-[4-(3'-Fluoro-7'-methylnonyloxy)phenyl]-5-dodecylpyrimidine
5-(3'-Fluoro-7'-methylnonyloxy)-2-(4-octylphenyl)pyrimidine
5-(3'-Fluoro-7'-methylnonyloxy)-2-(4-nonylphenyl)pyrimidine
5-(3'-Fluoro-7'-methylnonyloxy)-2-(4-decylphenyl)pyrimidine
5-(3'-Fluoro-7'-methylnonyloxy)-2-(4-undecylphenyl)pyrimidine
5-(3'-Fluoro-7'-methylnonyloxy)-2-(4-dodecylphenyl)pyrimidine
2-[4-(3'-Fluoro-7'-methyldecyloxy)phenyl]-5-octylpyrimidine
2-[4-(3'-Fluoro-7'-methyldecyloxy)phenyl]-5-nonylpyrimidine
2-[4-(3'-Fluoro-7'-methyldecyloxy)phenyl]-5-decylpyrimidine
2-[4-(3'-Fluoro-7'-methyldecyloxy)phenyl]-5-undecylpyrimidine
2-[4-(3'-Fluoro-7'-methyldecyloxy)phenyl]-5-dodecylpyrimidine
5-(3'-Fluoro-7'-methyldecyloxy)-2-(4-octylphenyl)pyrimidine
5-(3'-Fluoro-7'-methyldecyloxy)-2-(4-nonylphenyl)pyrimidine
5-(3'-Fluoro-7'-methyldecyloxy)-2-(4-decylphenyl)pyrimidine
5-(3'-Fluoro-7'-methyldecyloxy)-2-(4-undecylphenyl)pyrimidine
5-(3'-Fluoro-7'-methyldecyloxy)-2-(4-dodecylphenyl)pyrimidine
2-[4-(3'-Fluoro-7'-methylundecyloxy)phenyl]-5-octylpyrimidine
2-[4-(3'-Fluoro-7'-methylundecyloxy)phenyl]-5-nonylpyrimidine
2-[4-(3'-Fluoro-7'-methylundecyloxy)phenyl]-5-decylpyrimidine
2-[4-(3'-Fluoro-7'-methylundecyloxy)phenyl]-5-undecylpyrimidine
2-[4-(3'-Fluoro-7'-methylundecyloxy)phenyl]-5-dodecylpyrimidine
5-(3'-Fluoro-7'-methylundecyloxy)-2-(4-octylphenyl)pyrimidine
5-(3'-Fluoro-7'-methylundecyloxy)-2-(4-nonylphenyl)pyrimidine
5-(3'-Fluoro-7'-methylundecyloxy)-2-(4-decylphenyl)pyrimidine
5-(3'-Fluoro-7'-methylundecyloxy)-2-(4-undecylphenyl)pyrimidine 5-(3'-Fluoro-7'-methylundecyloxy)-2-(4-dodecylphenyl)pyrimidine
2-[4-(3'-Fluoro-7'-methyldodecyloxy)phenyl]-5-octylpyrimidine
2-[4-(3'-Fluoro-7'-methyldodecyloxy)phenyl]-5-nonylpyrimidine
2-[4-(3'-Fluoro-7'-methyldodecyloxy)phenyl]-5-decylpyrimidine
2-[4-(3'-Fluoro-7'-methyldodecyloxy)phenyl]-5-undecylpyrimidine
2-[4-(3'-Fluoro-7'-methyldodecyloxy)phenyl]-5-dodecylpyrimidine
5-(3'-Fluoro-7'-methyldodecyloxy)-2-(4-octylphenyl)pyrimidine
5-(3'-Fluoro-7'-methyldodecyloxy)-2-(4-nonylphenyl)pyrimidine
5-(3'-Fluoro-7'-methyldodecyloxy)-2-(4-decylphenyl)pyrimidine
5-(3'-Fluoro-7'-methyldodecyloxy)-2-(4-undecylphenyl)pyrimidine
5-(3'-Fluoro-7'-methyldodecyloxy)-2-(4-dodecylphenyl)pyrimidine (2) Compounds containing two asymmetric carbon atoms both of which are substituted with a fluorine atom:

2-[4-(2',3'-Difluoropentyloxy)phenyl]-5-octylpyrimidine
2-[4-(2',3'-Difluoropentyloxy)phenyl]-5-nonylpyrimidine
2-[4-(2',3'-Difluoropentyloxy)phenyl]-5-decylpyrimidine
2-[4-(2',3'-Difluoropentyloxy)phenyl]-5-undecylpyrimidine
2-[4-(2',3'-Difluoropentyloxy)phenyl]-5-dodecylpyrimidine
5-(2',3'-Difluoropentyloxy)-2-(4-octylphenyl)pyrimidine
5-(2',3'-Difluoropentyloxy)-2-(4-nonylphenyl)pyrimidine
5-(2',3'-Difluoropentyloxy)-2-(4-decylphenyl)pyrimidine
5-(2',3'-Difluoropentyloxy)-2-(4-undecylphenyl)pyrimidine
5-(2',3'-Difluoropentyloxy)-2-(4-dodecylphenyl)pyrimidine
2-[4-(2',3'-Difluorohexyloxy)phenyl]-5-octylpyrimidine
2-[4-(2',3'-Difluorohexyloxy)phenyl]-5-nonylpyrimidine
2-[4-(2',3'-Difluorohexyloxy)phenyl]-5-decylpyrimidine
2-[4-(2',3'-Difluorohexyloxy)phenyl]-5-undecylpyrimidine
2-[4-(2',3'-Difluorohexyloxy)phenyl]-5-dodecylpyrimidine
5-(2',3'-Difluorohexyloxy)-2-(4-octylphenyl)pyrimidine
5-(2',3'-Difluorohexyloxy)-2-(4-nonylphenyl)pyrimidine
5-(2',3'-Difluorohexyloxy)-2-(4-decylphenyl)pyrimidine
5-(2',3'-Difluorohexyloxy)-2-(4-undecylphenyl)pyrimidine
5-(2',3'-Difluorohexyloxy)-2-(4-dodecylphenyl)pyrimidine
2-[4-(2',3'-Difluoroheptyloxy)phenyl]-5-octylpyrimidine
2-[4-(2',3'-Difluoroheptyloxy)phenyl]-5-nonylpyrimidine
2-[4-(2',3'-Difluoroheptyloxy)phenyl]-5-decylpyrimidine
2-[4-(2',3'-Difluoroheptyloxy)phenyl]-5-undecylpyrimidine
2-[4-(2',3'-Difluoroheptyloxy)phenyl]-5-dodecylpyrimidine
5-(2',3'-Difluoroheptyloxy)-2-(4-octylphenyl)pyrimidine
5-(2',3'-Difluoroheptyloxy)-2-(4-nonylphenyl)pyrimidine
5-(2',3'-Difluoroheptyloxy)-2-(4-decylphenyl)pyrimidine
5-(2',3'-Difluoroheptyloxy)-2-(4-undecylphenyl)pyrimidine
5-(2',3'-Difluoroheptyloxy)-2-(4-dodecylphenyl)pyrimidine
2-[4-(2',3'-Difluorooctyloxy)phenyl]-5-octylpyrimidine
2-[4-(2',3'-Difluorooctyloxy)phenyl]-5-nonylpyrimidine
2-[4-(2',3'-Difluorooctyloxy)phenyl]-5-decylpyrimidine
2-[4-(2',3'-Difluorooctyloxy)phenyl]-5-undecylpyrimidine
2-[4-(2',3'-Difluorooctyloxy)phenyl]-5-dodecylpyrimidine
5-(2',3'-Difluorooctyloxy)-2-(4-octylphenyl)pyrimidine
5-(2',3'-Difluorooctyloxy)-2-(4-nonylphenyl)pyrimidine
5-(2',3'-Difluorooctyloxy)-2-(4-decylphenyl)pyrimidine
5-(2',3'-Difluorooctyloxy)-2-(4-undecylphenyl)pyrimidine
5-(2',3'-Difluorooctyloxy)-2-(4-dodecylphenyl)pyrimidine
2-[4-(2',4'-Difluorohexyloxy)phenyl]-5-octylpyrimidine
2-[4-(2',4'-Difluorohexyloxy)phenyl]-5-nonylpyrimidine
2-[4-(2',4'-Difluorohexyloxy)phenyl]-5-decylpyrimidine
2-[4-(2',4'-Difluorohexyloxy)phenyl]-5-undecylpyrimidine
2-[4-(2',4'-Difluorohexyloxy)phenyl]-5-dodecylpyrimidine
5-(2',4'-Difluorohexyloxy)-2-(4-octylphenyl)pyrimidine
5-(2',4'-Difluorohexyloxy)-2-(4-nonylphenyl)pyrimidine
5-(2',4'-Difluorohexyloxy)-2-(4-decylphenyl)pyrimidine
5-(2',4'-Difluorohexyloxy)-2-(4-undecylphenyl)pyrimidine
5-(2',4'-Difluorohexyloxy)-2-(4-dodecylphenyl)pyrimidine
2-[4-(2',4'-Difluoroheptyloxy)phenyl]-5-octylpyrimidine
2-[4-(2',4'-Difluoroheptyloxy)phenyl]-5-nonylpyrimidine
2-[4-(2',4'-Difluoroheptyloxy)phenyl]-5-decylpyrimidine
2-[4-(2',4'-Difluoroheptyloxy)phenyl]-5-undecylpyrimidine
2-[4-(2',4'-Difluoroheptyloxy)phenyl]-5-dodecylpyrimidine
5-(2',4'-Difluoroheptyloxy)-2-(4-octylphenyl)pyrimidine
5-(2',4'-Difluoroheptyloxy)-2-(4-nonylphenyl)pyrimidine
5-(2',4'-Difluoroheptyloxy)-2-(4-decylphenyl)pyrimidine
5-(2',4'-Difluoroheptyloxy)-2-(4-undecylphenyl)pyrimidine
5-(2',4'-Difluoroheptyloxy)-2-(4-dodecylphenyl)pyrimidine
2-[4-(2',4'-Difluorooctyloxy)phenyl]-5-octylpyrimidine
2-[4-(2',4'-Difluorooctyloxy)phenyl]-5-nonylpyrimidine
2-[4-(2',4'-Difluorooctyloxy)phenyl]-5-decylpyrimidine
2-[4-(2',4'-Difluorooctyloxy)phenyl]-5-undecylpyrimidine
2-[4-(2',4'-Difluorooctyloxy)phenyl]-5-dodecylpyrimidine
5-(2',4'-Difluorooctyloxy)-2-(4-octylphenyl)pyrimidine
5-(2',4'-Difluorooctyloxy)-2-(4-nonylphenyl)pyrimidine
5-(2',4'-Difluorooctyloxy)-2-(4-decylphenyl)pyrimidine 5-(2',4'-Difluorooctyloxy)-2-(4-undecylphenyl)pyrimidine
5-(2',4'-Difluorooctyloxy)-2-(4-dodecylphenyl)pyrimidine
2-[4-(2',4'-Difluorononyloxy)phenyl]-5-octylpyrimidine
2-[4-(2',4'-Difluorononyloxy)phenyl]-5-nonylpyrimidine
2-[4-(2',4'-Difluorononyloxy)phenyl]-5-decylpyrimidine
2-[4-(2',4'-Difluorononyloxy)phenyl]-5-undecylpyrimidine
2-[4-(2',4'-Difluorononyloxy)phenyl]-5-dodecylpyrimidine
5-(2',4'-Difluorononyloxy)-2-(4-octylphenyl)pyrimidine
5-(2',4'-Difluorononyloxy)-2-(4-nonylphenyl)pyrimidine
5-(2',4'-Difluorononyloxy)-2-(4-decylphenyl)pyrimidine
5-(2',4'-Difluorononyloxy)-2-(4-undecylphenyl)pyrimidine
5-(2',4'-Difluorononyloxy)-2-(4-dodecylphenyl)pyrimidine
2-[4-(2',5'-Difluoroheptyloxy)phenyl]-5-octylpyrimidine
2-[4-(2',5'-Difluoroheptyloxy)phenyl]-5-nonylpyrimidine
2-[4-(2',5'-Difluoroheptyloxy)phenyl]-5-decylpyrimidine
2-[4-(2',5'-Difluoroheptyloxy)phenyl]-5-undecylpyrimidine
2-[4-(2',5'-Difluoroheptyloxy)phenyl]-5-dodecylpyrimidine
5-(2',5'-Difluoroheptyloxy)-2-(4-octylphenyl)pyrimidine
5-(2',5'-Difluoroheptyloxy)-2-(4-nonylphenyl)pyrimidine
5-(2',5'-Difluoroheptyloxy)-2-(4-decylphenyl)pyrimidine
5-(2',5'-Difluoroheptyloxy)-2-(4-undecylphenyl)pyrimidine
5-(2',5'-Difluoroheptyloxy)-2-(4-dodecylphenyl)pyrimidine
2-[4-(2',5'-Difluorononyloxy)phenyl]-5-octylpyrimidine
2-[4-(2',5'-Difluorononyloxy)phenyl]-5-nonylpyrimidine
2-[4-(2',5'-Difluorononyloxy)phenyl]-5-decylpyrimidine
2-[4-(2',5'-Difluorononyloxy)phenyl]-5-undecylpyrimidine
2-[4-(2',5'-Difluorononyloxy)phenyl]-5-dodecylpyrimidine
5-(2',5'-Difluorononyloxy)-2-(4-octylphenyl)pyrimidine
5-(2',5'-Difluorononyloxy)-2-(4-nonylphenyl)pyrimidine
5-(2',5'-Difluorononyloxy)-2-(4-decylphenyl)pyrimidine
5-(2',5'-Difluorononyloxy)-2-(4-undecylphenyl)pyrimidine
5-(2',5'-Difluorononyloxy)-2-(4-dodecylphenyl)pyrimidine
2-[4-(2',5'-Difluorodecyloxy)phenyl]-5-octylpyrimidine
2-[4-(2',5'-Difluorodecyloxy)phenyl]-5-nonylpyrimidine
2-[4-(2',5'-Difluorodecyloxy)phenyl]-5-decylpyrimidine
2-[4-(2',5'-Difluorodecyloxy)phenyl]-5-undecylpyrimidine
2-[4-(2',5'-Difluorodecyloxy)phenyl]-5-dodecylpyrimidine
5-(2',5'-Difluorodecyloxy)-2-(4-octylphenyl)pyrimidine
5-(2',5'-Difluorodecyloxy)-2-(4-nonylphenyl)pyrimidine
5-(2',5'-Difluorodecyloxy)-2-(4-decylphenyl)pyrimidine
5-(2',5'-Difluorodecyloxy)-2-(4-undecylphenyl)pyrimidine
5-(2',5'-Difluorodecyloxy)-2-(4-dodecylphenyl)pyrimidine
2-[4-(2',6'-Difluorooctyloxy)phenyl]-5-octylpyrimidine
2-[4-(2',6'-Difluorooctyloxy)phenyl]-5-nonylpyrimidine
2-[4-(2',6'-Difluorooctyloxy)phenyl]-5-decylpyrimidine
2-[4-(2',6'-Difluorooctyloxy)phenyl]-5-undecylpyrimidine
2-[4-(2',6'-Difluorooctyloxy)phenyl]-5-dodecylpyrimidine
5-(2',6'-Difluorooctyloxy)-2-(4-octylphenyl)pyrimidine
5-(2',6'-Difluorooctyloxy)-2-(4-nonylphenyl)pyrimidine
5-(2',6'-Difluorooctyloxy)-2-(4-decylphenyl)pyrimidine
5-(2',6'-Difluorooctyloxy)-2-(4-undecylphenyl)pyrimidine
5-(2',6'-Difluorooctyloxy)-2-(4-dodecylphenyl)pyrimidine
5-[4-(2',6'-Difluorononyloxy)phenyl]-5-octylpyrimidine
2-[4-(2',6'-Difluorononyloxy)phenyl]-5-nonylpyrimidine
2-[4-(2',6'-Difluorononyloxy)phenyl]-5-decylpyrimidine
2-[4-(2',6'-Difluorononyloxy)phenyl]-5-undecylpyrimidine
2-[4-(2',6'-Difluorononyloxy)phenyl]-5-dodecylpyrimidine
5-(2',6'-Difluorononyloxy)-2-(4-octylphenyl)pyrimidine
5-(2',6'-Difluorononyloxy)-2-(4-nonylphenyl)pyrimidine
5-(2',6'-Difluorononyloxy)-2-(4-decylphenyl)pyrimidine
5-(2',6'-Difluorononyloxy)-2-(4-undecylphenyl)pyrimidine
5-(2',6'-Difluorononyloxy)-2-(4-dodecylphenyl)pyrimidine
2-[4-(2',6'-Difluorodecyloxy)phenyl]-5-octylpyrimidine
2-[4-(2',6'-Difluorodecyloxy)phenyl]-5-nonylpyrimidine
2-[4-(2',6'-Difluorodecyloxy)phenyl]-5-decylpyrimidine
2-[4-(2',6'-Difluorodecyloxy)phenyl]-5-undecylpyrimidine
2-[4-(2',6'-Difluorodecyloxy)phenyl]-5-dodecylpyrimidine
5-(2',6'-Difluorodecyloxy)-2-(4-octylphenyl)pyrimidine
5-(2',6'-Difluorodecyloxy)-2-(4-nonylphenyl)pyrimidine
5-(2',6'-Difluorodecyloxy)-2-(4-decylphenyl)pyrimidine
5-(2',6'-Difluorodecyloxy)-2-(4-undecylphenyl)pyrimidine
5-(2',6'-Difluorodecyloxy)-2-(4-dodecylphenyl)pyrimidine
2-[4-(2',6'-Difluoroundecyloxy)phenyl]-5-octylpyrimidine
2-[4-(2',6'-Difluoroundecyloxy)phenyl]-5-nonylpyrimidine
2-[4-(2',6'-Difluoroundecyloxy)phenyl]-5-decylpyrimidine
2-[4-(2',6'-Difluoroundecyloxy)phenyl]-5-undecylpyrimidine
2-[4-(2',6'-Difluoroundecyloxy)phenyl]-5-dodecylpyrimidine
5-(2',6'-Difluoroundecyloxy)-2-(4-octylphenyl)pyrimidine
5-(2',6'-Difluoroundecyloxy)-2-(4-nonylphenyl)pyrimidine
5-(2',6'-Difluoroundecyloxy)-2-(4-decylphenyl)pyrimidine
5-(2',6'-Difluoroundecyloxy)-2-(4-undecylphenyl)pyrimidine 5-(2',6'-Difluoroundecyloxy)-2-(4-dodecylphenyl)pyrimidine
2-[4-(3',4'-Difluorohexyloxy)phenyl]-5-octylpyrimidine
2-[4-(3',4'-Difluorohexyloxy)phenyl]-5-nonylpyrimidine
2-[4-(3',4'-Difluorohexyloxy)phenyl]-5-decylpyrimidine
2-[4-(3',4'-Difluorohexyloxy)phenyl]-5-undecylpyrimidine
2-[4-(3',4'-Difluorohexyloxy)phenyl]-5-dodecylpyrimidine
5-(3',4'-Difluorohexyloxy)-2-(4-octylphenyl)pyrimidine
5-(3',4'-Difluorohexyloxy)-2-(4-nonylphenyl)pyrimidine
5-(3',4'-Difluorohexyloxy)-2-(4-decylphenyl)pyrimidine
5-(3',4'-Difluorohexyloxy)-2-(4-undecylphenyl)pyrimidine
5-(3',4'-Difluorohexyloxy)-2-(4-dodecylphenyl)pyrimidine
2-[4-(3',4'-Difluoroheptyloxy)phenyl]-5-octylpyrimidine
2-[4-(3',4'-Difluoroheptyloxy)phenyl]-5-nonylpyrimidine
2-[4-(3',4'-Difluoroheptyloxy)phenyl]-5-decylpyrimidine
2-[4-(3',4'-Difluoroheptyloxy)phenyl]-5-undecylpyrimidine
2-[4-(3',4'-Difluoroheptyloxy)phenyl]-5-dodecylpyrimidine
5-(3',4'-Difluoroheptyloxy)-2-(4-octylphenyl)pyrimidine
5-(3',4'-Difluoroheptyloxy)-2-(4-nonylphenyl)pyrimidine
5-(3',4'-Difluoroheptyloxy)-2-(4-decylphenyl)pyrimidine
5-(3',4'-Difluoroheptyloxy)-2-(4-undecylphenyl)pyrimidine
5-(3',4'-Difluoroheptyloxy)-2-(4-dodecylphenyl)pyrimidine
2-[4-(3',4'-Difluorooctyloxy)phenyl]-5-octylpyrimidine
2-[4-(3',4'-Difluorooctyloxy)phenyl]-5-nonylpyrimidine
2-[4-(3',4'-Difluorooctyloxy)phenyl]-5-decylpyrimidine
2-[4-(3',4'-Difluorooctyloxy)phenyl]-5-undecylpyrimidine
2-[4-(3',4'-Difluorooctyloxy)phenyl]-5-dodecylpyrimidine
5-(3',4 '-Difluorooctyloxy)-2-(4-octylphenyl)pyrimidine
5-(3',4'-Difluorooctyloxy)-2-(4-nonylphenyl)pyrimidine
5-(3',4'-Difluorooctyloxy)-2-(4-decylphenyl)pyrimidine
5-(3',4'-Difluorooctyloxy)-2-(4-undecylphenyl)pyrimidine
5-(3',4,-Difluorooctyloxy)-2-(4-dodecylphenyl)pyrimidine
2-[4-(3',4,-Difluorononyloxy)phenyl]-5-octylpyrimidine
2-[4-(3',4,-Difluorononyloxy)phenyl]-5-nonylpyrimidine
2-[4-(3',4,-Difluorononyloxy)phenyl]-5-decylpyrimidine
2-[4-(3',4,-Difluorononyloxy)phenyl]-5-undecylpyrimidine
2-[4-(3',4,-Difluorononyloxy)phenyl]-5-dodecylpyrimidine
5-(3',4,-Difluorononyloxy)-2-(4-octylphenyl)pyrimidine
5-(3',4'-Difluorononyloxy)-2-(4-nonylphenyl)pyrimidine
5-(3',4'-Difluorononyloxy)-2-(4-decylphenyl)pyrimidine
5-(3',4'-Difluorononyloxy)-2-(4-undecylphenyl)pyrimidine
5-(3',4'-Difluorononyloxy)-2-(4-dodecylphenyl)pyrimidine
2-[4-(3',5'-Difluoroheptyloxy)phenyl]-5-octylpyrimidine
2-[4-(3',5'-Difluoroheptyloxy)phenyl]-5-nonylpyrimidine
2-[4-(3',5'-Difluoroheptyloxy)phenyl]-5-decylpyrimidine
2-[4-(3',5'-Difluoroheptyloxy)phenyl]-5-undecylpyrimidine
2-[4-(3',5'-Difluoroheptyloxy)phenyl]-5-dodecylpyrimidine
5-(3',5'-Difluoroheptyloxy)-2-(4-octylphenyl)pyrimidine
5-(3',5'-Difluoroheptyloxy)-2-(4-nonylphenyl)pyrimidine
5-(3',5'-Difluoroheptyloxy)-2-(4-decylphenyl)pyrimidine
5-(3',5'-Difluoroheptyloxy)-2-(4-undecylphenyl)pyrimidine
5-(3',5'-Difluoroheptyloxy)-2-(4-dodecylphenyl)pyrimidine
2-[4-(3',5'-Difluorooctyloxy)phenyl]-5-octylpyrimidine
2-[4-(3',5'-Difluorooctyloxy)phenyl]-5-nonylpyrimidine
2-[4-3',5'-Difluorooctyloxy)phenyl]-5-decylpyrimidine
2-[4-3',5'-Difluorooctyloxy)phenyl]-5-undecylpyrimidine
2-[4-(3',5'-Difluorooctyloxy)phenyl]-5-dodecylpyrimidine
5-(3',5'-Difluorooctyloxy)-2-(4-octylphenyl)pyrimidine
5-(3',5'-Difluorooctyloxy)-2-(4-nonylphenyl)pyrimidine
5-(3',5'-Difluorooctyloxy)-2-(4-decylphenyl)pyrimidine
5-(3',5'-Difluorooctyloxy)-2-(4-undecylphenyl)pyrimidine
5-(3',5'-Difluorooctyloxy)-2-(4-dodecylphenyl)pyrimidine
2-[4-(3',5'-Difluorononyloxy)phenyl]-5-octylpyrimidine
2-[4-(3',5'-Difluorononyloxy)phenyl]-5-nonylpyrimidine
2-[4-(3',5'-Difluorononyloxy)phenyl]-5-decylpyrimidine
2-[4-(3',5'-Difluorononyloxy)phenyl]-5-undecylpyrimidine
2-[4-(3',5'-Difluorononyloxy)phenyl]-5-dodecylpyrimidine
5-(3',5'-Difluorononyloxy)-2-(4-octylphenyl)pyrimidine
5-(3',5'-Difluorononyloxy)-2-(4-nonylphenyl)pyrimidine
5-(3',5'-Difluorononyloxy)-2-(4-decylphenyl)pyrimidine
5-(3',5'-Difluorononyloxy)-2-(4-undecylphenyl)pyrimidine
5-(3',5'-Difluorononyloxy)-2-(4-dodecylphenyl)pyrimidine
2-[4-(3',5'-Difluorodecyloxy)phenyl]-5-octylpyrimidine
2-[4-(3',5'-Difluorodecyloxy)phenyl]-5-nonylpyrimidine
2-[4-(3',5'-Difluorodecyloxy)phenyl]-5-decylpyrimidine
2-[4-(3',5'-Difluorodecyloxy)phenyl]-5-undecylpyrimidine
2-[4-(3',5'-Difluorodecyloxy)phenyl]-5-dodecylpyrimidine
5-(3',5'-Difluorodecyloxy)-2-(4-octylphenyl)pyrimidine
5-(3',5'-Difluorodecyloxy)-2-(4-nonylphenyl)pyrimidine
5-(3',5'-Difluorodecyloxy)-2-(4-decylphenyl)pyrimidine
5-(3',5'-Difluorodecyloxy)-2-(4-undecylphenyl)pyrimidine
5-(3',5'-Difluorodecyloxy)-2-(4-dodecylphenyl)pyrimidine
2-[4-(3',6'-Difluorooctyloxy)phenyl]-5-octylpyrimidine
2-[4-(3',6'-Difluorooctyloxy)phenyl]-5-nonylpyrimidine
2-[4-(3',6'-Difluorooctyloxy)phenyl]-5-decylpyrimidine
2-[4-(3',6'-Difluorooctyloxy)phenyl]-5-undecylpyrimidine 2-[4-(3',6'-Difluorooctyloxy)phenyl]-5-dodecylpyrimidine
5-(3',6'-Difluorooctyloxy)-2-(4-octylphenyl)pyrimidine
5-(3',6'-Difluorooctyloxy)-2-(4-nonylphenyl)pyrimidine
5-(3',6'-Difluorooctyloxy)-2-(4-decylphenyl)pyrimidine
5-(3',6'-Difluorooctyloxy)-2-(4-undecylphenyl)pyrimidine
5-(3',6,-Difluorooctyloxy)-2-(4-dodecylphenyl)pyrimidine
2-[4-(3',6'-Difluorononyloxy)phenyl]-5-octylpyrimidine
2-[4-(3',6'-Difluorononyloxy)phenyl]-5-nonylpyrimidine
2-[4-(3',6'-Difluorononyloxy)phenyl]-5-decylpyrimidine
2-[4-(3',6'-Difluorononyloxy)phenyl]-5-undecylpyrimidine
2-[4-(3',6'-Difluorononyloxy)phenyl]-5-dodecylpyrimidine
5-(3',6'-Difluorononyloxy)-2-(4-octylphenyl)pyrimidine
5-(3',6'-Difluorononyloxy)-2-(4-nonylphenyl)pyrimidine
5-(3',6'-Difluorononyloxy)-2-(4-decylphenyl)pyrimidine
5-(3',6'-Difluorononyloxy)-2-(4-undecylphenyl)pyrimidine
5-(3',6'-Difluorononyloxy)-2-(4-dodecylphenyl)pyrimidine
2-[4-(3',6'-Difluorodecyloxy)phenyl]-5-octylpyrimidine
2-[4-(3',6'-Difluorodecyloxy)phenyl]-5-nonylpyrimidine
2-[4-(3',6'-Difluorodecyloxy)phenyl]-5-decylpyrimidine
2-[4-(3',6'-Difluorodecyloxy)phenyl]-5-undecylpyrimidine
2-[4-(3',6'-Difluorodecyloxy)phenyl]-5-dodecylpyrimidine
5-(3',6'-Difluorodecyloxy)-2-(4-octylphenyl)pyrimidine
5-(3',6'-Difluorodecyloxy)-2-(4-nonylphenyl)pyrimidine
5-(3',6'-Difluorodecyloxy)-2-(4-decylphenyl)pyrimidine
5-(3',6'-Difluorodecyloxy)-2-(4-undecylphenyl)pyrimidine
5-(3',6'-Difluorodecyloxy)-2-(4-dodecylphenyl)pyrimidine
2-[4-(3',6'-Difluoroundecyloxy)phenyl]-5-octylpyrimidine
2-[4-(3',6'-Difluoroundecyloxy)phenyl]-5-nonylpyrimidine
2-[4-(3',6'-Difluoroundecyloxy)phenyl]-5-decylpyrimidine
2-[4-(3',6'-Difluoroundecyloxy)phenyl]-5-undecylpyrimidine
2-[4-(3',6'-Difluoroundecyloxy)phenyl]-5-dodecylpyrimidine
5-(3',6'-Difluoroundecyloxy)-2-(4-octylphenyl)pyrimidine
5-(3',6'-Difluoroundecyloxy)-2-(4-nonylphenyl)pyrimidine
5-(3',6'-Difluoroundecyloxy)-2-(4-decylphenyl)pyrimidine
5-(3',6'-Difluoroundecyloxy)-2-(4-undecylphenyl)pyrimidine
5-(3',6'-Difluoroundecyloxy)-2-(4-dodecylphenyl)pyrimidine
2-[4-(3',7'-Difluorononyloxy)phenyl]-5-octylpyrimidine
2-[4-(3',7'-Difluorononyloxy)phenyl]-5-nonylpyrimidine
2-[4-(3',7'-Difluorononyloxy)phenyl]-5-decylpyrimidine
2-[4-(3',7'-Difluorononyloxy)phenyl]-5-undecylpyrimidine
2-[4-(3',7'-Difluorononyloxy)phenyl]-5-dodecylpyrimidine
5-(3',7'-Difluorononyloxy)-2-(4-octylphenyl)pyrimidine
5-(3',7'-Difluorononyloxy)-2-(4-nonylphenyl)pyrimidine
5-(3',7'-Difluorononyloxy)-2-(4-decylphenyl)pyrimidine
5-(3',7'-Difluorononyloxy)-2-(4-undecylphenyl)pyrimidine
5-(3',7'-Difluorononyloxy)-2-(4-dodecylphenyl)pyrimidine
2-[4-(3',7'-Difluorodecyloxy)phenyl]-5-octylpyrimidine
2-[4-(3',7'-Difluorodecyloxy)phenyl]-5-nonylpyrimidine
2-[4-(3',7'-Difluorodecyloxy)phenyl]-5-decylpyrimidine
2-[4-(3',7'-Difluorodecyloxy)phenyl]-5-undecylpyrimidine
2-[4-(3',7'-Difluorodecyloxy)phenyl]-5-dodecylpyrimidine
5-(3',7'-Difluorodecyloxy)-2-(4-octylphenyl)pyrimidine
5-(3',7'-Difluorodecyloxy)-2-(4-nonylphenyl)pyrimidine
5-(3',7'-Difluorodecyloxy)-2-(4-decylphenyl)pyrimidine
5-(3',7'-Difluorodecyloxy)-2-(4-undecylphenyl)pyrimidine
5-(3',7'-Difluorodecyloxy)-2-(4-dodecylphenyl)pyrimidine
2-[4-(3',7'-Difluoroundecyloxy)phenyl]-5-octylpyrimidine
2-[4-(3',7'-Difluoroundecyloxy)phenyl]-5-nonylpyrimidine
2-[4-(3',7'-Difluoroundecyloxy)phenyl]-5-decylpyrimidine
2-[4-(3',7'-Difluoroundecyloxy)phenyl]-5-undecylpyrimidine
2-[4-(3',7'-Difluoroundecyloxy)phenyl]-5-dodecylpyrimidine
5-(3',7'-Difluoroundecyloxy)-2-(4-octylphenyl)pyrimidine
5-(3',7'-Difluoroundecyloxy)-2-(4-nonylphenyl)pyrimidine
5-(3',7'-Difluoroundecyloxy)-2-(4-decylphenyl)pyrimidine
5-(3',7'-Difluoroundecyloxy)-2-(4-undecylphenyl)pyrimidine
5-(3',7'-Difluoroundecyloxy)-2-(4-dodecylphenyl)pyrimidine
2-[4-(3',7'-Difluorododecyloxy)phenyl]-5-octylpyrimidine
2-[4-(3',7'-Difluorododecyloxy)phenyl]-5-nonylpyrimidine
2-[4-(3',7'-Difluorododecyloxy)phenyl]-5-decylpyrimidine
2-[4-(3',7'-Difluorododecyloxy)phenyl]-5-undecylpyrimidine
2-[4-(3',7'-Difluorododecyloxy)phenyl]-5-dodecylpyrimidine
5-(3',7'-Difluorododecyloxy)-2-(4-octylphenyl)pyrimidine
5-(3',7'-Difluorododecyloxy)-2-(4-nonylphenyl)pyrimidine
5-(3',7'-Difluorododecyloxy)-2-(4-decylphenyl)pyrimidine 5-(3',7'-Difluorododecyloxy)-2-(4-undecylphenyl)pyrimidine 5-(3',7'-Difluorododecyloxy)-2-(4-dodecylphenyl)pyrimidine Each of the compounds (1) and (2) listed above has four stereoisomers due to two asymmetric carbon atoms.

(3) Compounds having one asymmetric carbon atom substituted with a fluorine atom:

2-[4-(3-Fluorobutyloxy)phenyl]-5-hexylpyrimidine
2-[4-(3-Fluorobutyloxy)phenyl]-5-heptylpyrimidine
2-[4-(3-Fluorobutyloxy)phenyl]-5-octylpyrimidine
2-[4-(3-Fluorobutyloxy)phenyl]-5-nonylpyrimidine
2-[4-(3-Fluorobutyloxy)phenyl]-5-decylpyrimidine
2-[4-(3-Fluorobutyloxy)phenyl]-5-undecylpyrimidine
2-[4-(3-Fluorobutyloxy)phenyl]-5-dodecylpyrimidine
2-[4-(3-Fluorobutyloxy)phenyl]-5-tridecylpyrimidine
2-[4-(3-Fluorobutyloxy)phenyl]-5-tetradecylpyrimidine
2-[4-(3-Fluoropentyloxy)phenyl]-5-hexylpyrimidine
2-[4-(3-Fluoropentyloxy)phenyl]-5-heptylpyrimidine
2-[4-(3-Fluoropentyloxy)phenyl]-5-octylpyrimidine
2-[4-(3-Fluoropentyloxy)phenyl]-5-nonylpyrimidine
2-[4-(3-Fluoropentyloxy)phenyl]-5-decylpyrimidine
2-[4-(3-Fluoropentyloxy)phenyl]-5-undecylpyrimidine
2-[4-(3-Fluoropentyloxy)phenyl]-5-dodecylpyrimidine
2-[4-(3-Fluoropentyloxy)phenyl]-5-tridecylpyrimidine
2-[4-(3-Fluoropentyloxy)phenyl]-5-tetradecylpyrimidine
2-[4-(3-Fluorohexyloxy)phenyl]-5-hexylpyrimidine
2-[4-(3-Fluorohexyloxy)phenyl]-5-heptylpyrimidine
2-[4-(3-Fluorohexyloxy)phenyl]-5-octylpyrimidine
2-[4-(3-Fluorohexyloxy)phenyl]-5-nonylpyrimidine
2-[4-(3-Fluorohexyloxy)phenyl]-5-decylpyrimidine
2-[4-(3-Fluorohexyloxy)phenyl]-5-undecylpyrimidine
2-[4-(3-Fluorohexyloxy)phenyl]-5-dodecylpyrimidine
2-[4-(3-Fluorohexyloxy)phenyl]-5-tridecylpyrimidine
2-[4-(3-Fluorohexyloxy)phenyl]-5-tetradecylpyrimidine
2-[4-(3-Fluoroheptyloxy)phenyl]-5-hexylpyrimidine
2-[4-(3-Fluoroheptyloxy)phenyl]-5-heptylpyrimidine
2-[4-(3-Fluoroheptyloxy)phenyl]-5-octylpyrimidine
2-[4-(3-Fluoroheptyloxy)phenyl]-5-nonylpyrimidine
2-[4-(3-Fluoroheptyloxy)phenyl]-5-decylpyrimidine
2-[4-(3-Fluoroheptyloxy)phenyl]-5-undecylpyrimidine
2-[4-(3-Fluoroheptyloxy)phenyl]-5-dodecylpyrimidine
2-[4-(3-Fluoroheptyloxy)phenyl]-5-tridecylpyrimidine
2-[4-(3-Fluoroheptyloxy)phenyl]-5-tetradecylpyrimidine
2-[4-(3-Fluorooctyloxy)phenyl]-5-hexylpyrimidine
2-[4-(3-Fluorooctyloxy)phenyl]-5-heptylpyrimidine
2-[4-(3-Fluorooctyloxy)phenyl]-5-octylpyrimidine
2-[4-(3-Fluorooctyloxy)phenyl]-5-nonylpyrimidine
2-[4-(3-Fluorooctyloxy)phenyl]-5-decylpyrimidine
2-[4-(3-Fluorooctyloxy)phenyl]-5-undecylpyrimidine
2-[4-(3-Fluorooctyloxy)phenyl]-5-dodecylpyrimidine
2-[4-(3-Fluorooctyloxy)phenyl]-5-tridecylpyrimidine
2-[4-(3-Fluorooctyloxy)phenyl]-5-tetradecylpyrimidine
2-[4-(3-Fluorononyloxy)phenyl]-5-hexylpyrimidine
2-[4-(3-Fluorononyloxy)phenyl]-5-heptylpyrimidine
2-[4-(3-Fluorononyloxy)phenyl]-5-octylpyrimidine
2-[4-(3-Fluorononyloxy)phenyl]-5-nonylpyrimidine
2-[4-(3-Fluorononyloxy)phenyl]-5-decylpyrimidine
2-[4-(3-Fluorononyloxy)phenyl]-5-undecylpyrimidine
2-[4-(3-Fluorononyloxy)phenyl]-5-dodecylpyrimidine
2-[4-(3-Fluorononyloxy)phenyl]-5-tridecylpyrimidine
2-[4-(3-Fluorononyloxy)phenyl]-5-tetradecylpyrimidine
2-[4-(3-Fluorodecyloxy)phenyl]-5-hexylpyrimidine
2-[4-(3-Fluorodecyloxy)phenyl]-5-heptylpyrimidine
2-[4-(3-Fluorodecyloxy)phenyl]-5-octylpyrimidine
2-[4-(3-Fluorodecyloxy)phenyl]-5-nonylpyrimidine
2-[4-(3-Fluorodecyloxy)phenyl]-5-decylpyrimidine
2-[4-(3-Fluorodecyloxy)phenyl]-5-undecylpyrimidine
2-[4-(3-Fluorodecyloxy)phenyl]-5-dodecylpyrimidine
2-[4-(3-Fluorodecyloxy)phenyl]-5-tridecylpyrimidine
2-[4-(3-Fluorodecyloxy)phenyl]-5-tetradecylpyrimidine
2-[4-(3-Fluoroundecyloxy)phenyl]-5-hexylpyrimidine
2-[4-(3-Fluoroundecyloxy)phenyl]-5-heptylpyrimidine
2-[4-(3-Fluoroundecyloxy)phenyl]-5-octylpyrimidine
2-[4-(3-Fluoroundecyloxy)phenyl]-5-nonylpyrimidine
2-[4-(3-Fluoroundecyloxy)phenyl]-5-decylpyrimidine
2-[4-(3-Fluoroundecyloxy)phenyl]-5-undecylpyrimidine
2-[4-(3-Fluoroundecyloxy)phenyl]-5-dodecylpyrimidine
2-[4-(3-Fluoroundecyloxy)phenyl]-5-tridecylpyrimidine
2-[4-(3-Fluoroundecyloxy)phenyl]-5-tetradecylpyrimidine
2-[4-(3-Fluorobutyloxy)-3-fluorophenyl]-5-hexylpyrimidine
2-[4-(3-Fluorobutyloxy)-3-fluorophenyl]-5-heptylpyrimidine
2-[4-(3-Fluorobutyloxy)-3-fluorophenyl]-5-octylpyrimidine
2-[4-(3-Fluorobutyloxy)-3-fluorophenyl]-5-nonylpyrimidine
2-[4-(3-Fluorobutyloxy)-3-fluorophenyl]-5-decylpyrimidine
2-[4-(3-Fluorobutyloxy)-3-fluorophenyl]-5-undecylpyrimidine
2-[4-(3-Fluorobutyloxy)-3-fluorophenyl]-5-dodecylpyrimidine
2-[4-(3-Fluorobutyloxy)-3-fluorophenyl]-5-tridecylpyrimidine
2-[4-(3-Fluorobutyloxy)-3-fluorophenyl]-5-tetradecylpyrimidine
2-[4-(3-Fluoropentyloxy)-3-fluorophenyl]-5-hexylpyrimidine
2-[4-(3-Fluoropentyloxy)-3-fluorophenyl]-5-heptylpyrimidine
2-[4-(3-Fluoropentyloxy)-3-fluorophenyl]-5-octylpyrimidine
2-[4-(3-Fluoropentyloxy)-3-fluorophenyl]-5-nonylpyrimidine
2-[4-(3-Fluoropentyloxy)-3-fluorophenyl]-5-decylpyrimidine
2-[4-(3-Fluoropentyloxy)-3-fluorophenyl]-5-undecylpyrimidine
2-[4-(3-Fluoropentyloxy)-3-fluorophenyl]-5-dodecylpyrimidine
2-[4-(3-Fluoropentyloxy)-3-fluorophenyl]-5-tridecylpyrimidine 2-[4-(3-Fluoropentyloxy)-3-fluorophenyl]-5-tetradecylpyrimidine
2-[4-(3-Fluorohexyloxy)-3-fluorophenyl]-5-hexylpyrimidine
2-[4-(3-Fluorohexyloxy)-3-fluorophenyl]-5-heptylpyrimidine
2-[4-(3-Fluorohexyloxy)-3-fluorophenyl]-5-octylpyrimidine
2-[4-(3-Fluorohexyloxy)-3-fluorophenyl]-5-nonylpyrimidine
2-[4-(3-Fluorohexyloxy)-3-fluorophenyl]-5-decylpyrimidine
2-[4-(3-Fluorohexyloxy)-3-fluorophenyl]-5-undecylpyrimidine
2-[4-(3-Fluorohexyloxy)-3-fluorophenyl]-5-dodecylpyrimidine
2-[4-(3-Fluorohexyloxy)-3-fluorophenyl]-5-tridecylpyrimidine
2-[4-(3-Fluorohexyloxy)-3-fluorophenyl]-5-tetradecylpyrimidine
2-[4-(3-Fluoroheptyloxy)-3-fluorophenyl]-5-hexylpyrimidine
2-[4-(3-Fluoroheptyloxy)-3-fluorophenyl]-5-heptylpyrimidine
2-[4-(3-Fluoroheptyloxy)-3-fluorophenyl]-5-octylpyrimidine
2-[4-(3-Fluoroheptyloxy)-3-fluorophenyl]-5-nonylpyrimidine
2-[4-(3-Fluoroheptyloxy)-3-fluorophenyl]-5-decylpyrimidine
2-[4-(3-Fluoroheptyloxy)-3-fluorophenyl]-5-undecylpyrimidine
2-[4-(3-Fluoroheptyloxy)-3-fluorophenyl]-5-dodecylpyrimidine
2-[4-(3-Fluoroheptyloxy)-3-fluorophenyl]-5-tridecylpyrimidine
2-[4-(3-Fluoroheptyloxy)-3-fluorophenyl]-5-tetradecylpyrimidine
2-[4-(3-Fluorooctyloxy)-3-fluorophenyl]-5-hexylpyrimidine
2-[4-(3-Fluorooctyloxy)-3-fluorophenyl]-5-heptylpyrimidine
2-[4-(3-Fluorooctyloxy)-3-fluorophenyl]-5-octylpyrimidine
2-[4-(3-Fluorooctyloxy)-3-fluorophenyl]-5-nonylpyrimidine
2-[4-(3-Fluorooctyloxy)-3-fluorophenyl]-5-decylpyrimidine
2-[4-(3-Fluorooctyloxy)-3-fluorophenyl]-5-undecylpyrimidine
2-[4-(3-Fluorooctyloxy)-3-fluorophenyl]-5-dodecylpyrimidine
2-[4-(3-Fluorooctyloxy)-3-fluorophenyl]-5-tridecylpyrimidine
2-[4-(3-Fluorooctyloxy)-3-fluorophenyl]-5-tetradecylpyrimidine
2-[4-(3-Fluorononyloxy)-3-fluorophenyl]-5-hexylpyrimidine
2-[4-(3-Fluorononyloxy)-3-fluorophenyl]-5-heptylpyrimidine
2-[4-(3-Fluorononyloxy)-3-fluorophenyl]-5-octylpyrimidine
2-[4-(3-Fluorononyloxy)-3-fluorophenyl]-5-nonylpyrimidine
2-[4-(3-Fluorononyloxy)-3-fluorophenyl]-5-decylpyrimidine
2-[4-(3-Fluorononyloxy)-3-fluorophenyl]-5-undecylpyrimidine
2-[4-(3-Fluorononyloxy)-3-fluorophenyl]-5-dodecylpyrimidine
2-[4-(3-Fluorononyloxy)-3-fluorophenyl]-5-tridecylpyrimidine
2-[4-(3-Fluorononyloxy)-3-fluorophenyl]-5-tetradecylpyrimidine
2-[4-(3-Fluorodecyloxy)-3-fluorophenyl]-5-hexylpyrimidine
2-[4-(3-Fluorodecyloxy)-3-fluorophenyl]-5-heptylpyrimidine
2-[4-(3-Fluorodecyloxy)-3-fluorophenyl]-5-octylpyrimidine
2-[4-(3-Fluorodecyloxy)-3-fluorophenyl]-5-nonylpyrimidine
2-[4-(3-Fluorodecyloxy)-3-fluorophenyl]-5-decylpyrimidine
2-[4-(3-Fluorodecyloxy)-3-fluorophenyl]-5-undecylpyrimidine
2-[4-(3-Fluorodecyloxy)-3-fluorophenyl]-5-dodecylpyrimidine
2-[4-(3-Fluorodecyloxy)-3-fluorophenyl]-5-tridecylpyrimidine
2-[4-(3-Fluorodecyloxy)-3-fluorophenyl]-5-tetradecylpyrimidine
2-[4-(3-Fluoroundecyloxy)-3-fluorophenyl]-5-hexylpyrimidine
2-[4-(3-Fluoroundecyloxy)-3-fluorophenyl]-5-heptylpyrimidine
2-[4-(3-Fluoroundecyloxy)-3-fluorophenyl]-5-octylpyrimidine
2-[4-(3-Fluoroundecyloxy)-3-fluorophenyl]-5-nonylpyrimidine
2-[4-(3-Fluoroundecyloxy)-3-fluorophenyl]-5-decylpyrimidine
2-[4-(3-Fluoroundecyloxy)-3-fluorophenyl]-5-undecylpyrimidine
2-[4-(3-Fluoroundecyloxy)-3-fluorophenyl]-5-dodecylpyrimidine
2-[4-(3-Fluoroundecyloxy)-3-fluorophenyl]-5-tridecylpyrimidine
2-[4-(3-Fluoroundecyloxy)-3-fluorophenyl]-5-tetradecylpyrimidine.

Each of the compounds (3) has two stereoisomers.

The achiral liquid crystal compounds represented by formula (III) include compounds of the following formulae:

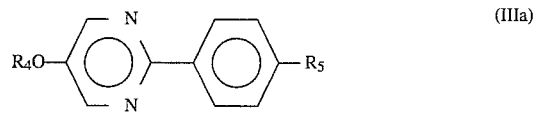

(IIIa)

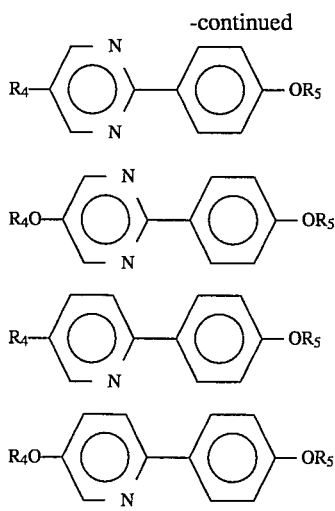

(IIIb)
(IIIc)
(IIId)
(IIIe)

wherein $R_4$ and $R_5$ are as defined above.

These achiral liquid crystal compounds of formula (III) can be synthesized by the processes disclosed in Okano Koji and Kobayashi Shunsuke, *EIKISHO KISOHEN*, pp. 232–251, Baifukan (1985), H. Zaschke, *J. Prakt. Chemie*, vol. 317, p. 617 (1975), West German Patent Publication No. 2257588 (1973), JP-A-61- 22072, JP-A-62-223172, and JP-A-63-301872.

In formula (III), $R_4$ and $R_5$ each preferably represent a straight chain or terminal-branched alkyl group having from 6 to 14 carbon atoms.

The ferroelectric liquid crystal composition of the present invention can be prepared by uniformly mixing the liquid crystal compound of formula (I), the optically active compound of formula (II), and the achiral liquid crystal compound of formula (III), preferably at a mixing ratio of 2 to 15:2 to 30:55 to 80 by mole %.

If desired, the ferroelectric liquid crystal composition may further contain other liquid crystal components or additives.

Examples of other liquid crystal components which may be added include compounds of the following formulae:

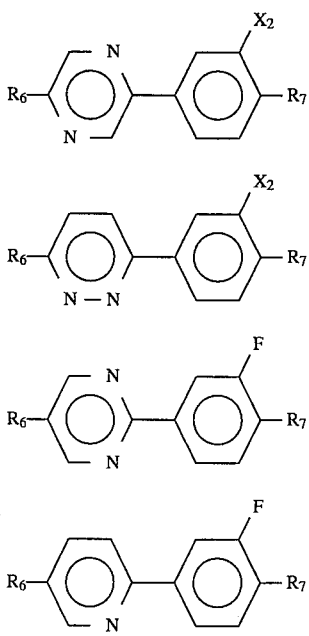

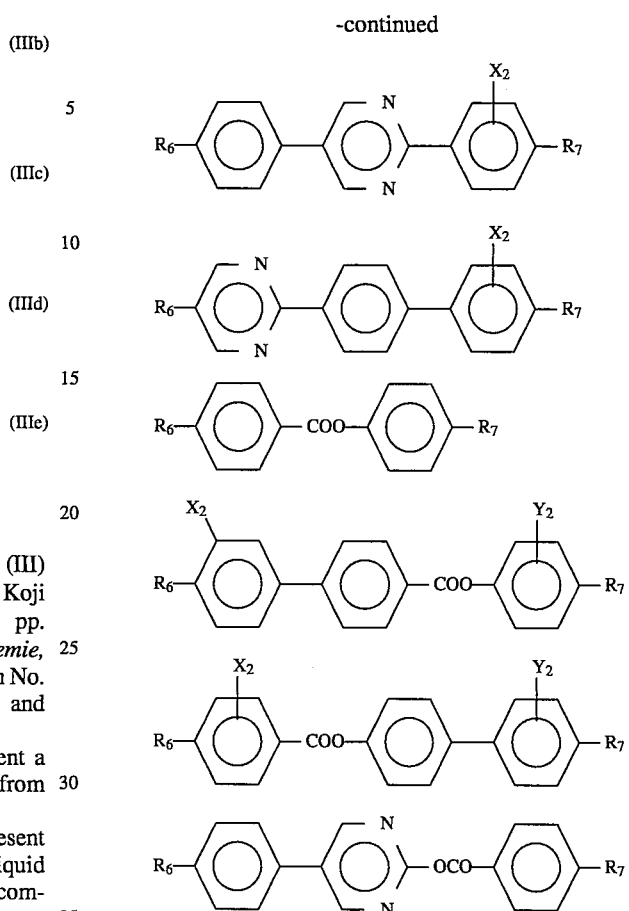

wherein $R_6$ and $R_7$ each represent a straight chain or branched alkyl or alkoxy group which may contain an asymmetric carbon atom; and $X_2$ and $Y_2$ each represents a hydrogen atom or a fluorine atom.

In particular, the ferroelectric liquid crystal composition of the present invention preferably includes (1) a composition showing a phase sequence of isotropic liquid phase-chiral nematic phase-smectic A phase-chiral smectic C phase on cooling and (2) a composition showing a phase sequence of isotropic liquid phase-smectic A phase-chiral smectic C phase on cooling. The preference is because a ferroelectric liquid crystal composition having its liquid crystal phases of a smectic A phase and a chiral nematic phase in higher temperature ranges exhibits more satisfactory orientation.

In the present invention, by the control of tilt angle of a ferroelectric liquid crystal composition, an electrooptical element having high memory effects and high contrast ratio can be obtained. Such effects of the present invention will be accounted for by the following reason.

Tilt angle with an electric field applied and tilt angle during memory are closely related to each other, and making the tilt angle with an electric field applied narrower than 22.5° brings about widening of the tilt angle during memory. In other words, memory effects can be improved by increasing the proportion of the tilt angle during memory to the tilt angle with an electric field applied. An increase in memory effects naturally leads to an increase in ratio of tilt angle during memory to tilt angle with electric field applied (hereinafter sometimes referred to as a memory ratio).

FIG. 2 illustrates the relationship between the tilt angle with an electric field applied and the tilt angle during memory. It is seen from FIG. 2 that conventionally studied compositions whose title angle with an electric field applied is around 22.5° or higher have a tilt angle during memory of a few degrees while the compositions of the present invention whose tilt angle with an electric field applied is narrowed have a wider tilt angle during memory.

It is thus understandable that the composition of the present invention exhibits a higher memory ratio and higher transmitted light intensity and achieves a higher contrast ratio.

On the other hand, with the composition being equal, the tilt angle with an electric field applied generally has an intimate relationship to spontaneous polarization. If the tilt angle with an electric field applied is extremely reduced, spontaneous polarization is also reduced, leading to a reduction in response time. Specifically, if the tilt angle with an electric field applied is less than 12°, spontaneous polarization becomes too small as is shown in Table 1 hereinafter described.

Further, if the memory ratio is less than about 0.4, contrast would be reduced. Accordingly, it is unfavorable to increase the tilt angle with an electric field applied over 18°.

Thus, it is of extreme importance for obtaining a proper response time and proper contrast ratio to control the tilt angle with an electric field applied within a range of from 12° to 18° while controlling the tilt angle during memory within a range of from 8° to 15°.

The excellent response time achieved by the ferroelectric liquid crystal composition of the present invention is believed ascribable to the narrow tilt angle with an electric field applied, which means a small shift of the liquid crystal on application of an electric field. A response time ($\tau$) of a ferroelectric liquid crystal is generally represented by formula:

$$\tau = \frac{\eta \cdot \sin 2\theta}{Ps \cdot E}$$

and considered dependent on viscosity ($\eta$), electric field intensity (E), and tilt angle ($\theta$) with an electric field applied. However, because the electric field intensity which may be applied is limited taking use of IC into consideration and also because a ferroelectric liquid crystal composition having a large spontaneous polarization (Ps) generally has a high viscosity, it is difficult to get the faster response time simply by increasing Ps.

Since a tilt angle with an electric field applied is not directly related to viscosity, etc., the ferroelectric liquid crystal composition of the present invention having a small tilt angle ($\theta$) respondes in a reduced time with the viscosity, spontaneous polarization, and electric field intensity being equal.

In addition, since the ferroelectric liquid crystal composition used in the present invention is such that exhibits a chiral smectic C phase and has the lowest viscosity among liquid crystal ,materials included in the category of ferroelectric liquid crystal materials, an excellent response time can be achieved as understood from the above formula.

As described above, the ferroelectric liquid crystal composition according to the present invention satisfies both requirements for high contrast ratio and fast response time which have been deemed conflicting to each other and is therefore very advantageous for, for example, liquid crystal display devices forming an image by potential scanning.

Liquid crystal display devices utilizing the ferroelectric liquid crystal composition of the present invention can be produced by, for example, placing the ferroelectric liquid crystal composition exhibiting a chiral smectic C phase in a cell composed of a pair of substrates having a transparent electrode and having been subjected to an orientation treatment, assembled at a cell gap of not more than 10 μm, in such a manner that the molecular longer axis and the substrates substantially be in parallel. When an alternating electric field having an intensity sufficient for unwinding the helix formed by the ferroelectric liquid crystal and causing inversion between the first and second stable states of the ferroelectric liquid crystal is applied to the display device, the applied area turns to an optically recognizable state thereby forming an image.

The ferroelectric liquid crystal composition according to the present invention has excellent contrast ratio and fast response time and is therefore widely useful in various liquid crystal display devices requiring a large display size and a high-density, such as TV sets, word processors, displays of computers, and page printers.

The present invention is now illustrated in greater detail with reference to Synthesis Examples, Examples, and Comparative Examples, but it should be understood that the present invention is not deemed to be limited thereto.

In Examples, a cell comprising a pair of glass substrates each having a transparent electrode on which a polyimide precursor is coated and heated to prepare a polyimide membrane and rubbed, assembled so that the rubbing directions be in parallel.

The tilt angle of the ferroelectric liquid crystal composition prepared was obtained from the extinction position under a crossed Nicol with a square wave of ±10 V/μm applied. A response time was obtained as an average of the speed of change of transmitted light intensity of from 0 to 90% and from 100 to 10% under the same conditions as in the measurement of tilt angle. A spontaneous polarization (Ps) was obtained from a polarization inversion current with a triangular wave of ±5 V/μm applied. Memory effects were evaluated by a memory ratio, i.e., a tilt angle during memory (with no electric field applied)/tilt angle with an electric field (square wave) applied ratio.

Abbreviations used have the following meanings:

I: Isotropic liquid phase
N*: Chiral nematic phase
$S_A$: Smectic A phase
$S_C^*$: Chiral smectic C phase
Cr: Crystal phase

SYNTHESIS EXAMPLE 1

Synthesis of (2'S,5'S)-2-[4-(2'-Fluoro-5'-methylheptyloxy)phenyl]-5-decylpyrimidine

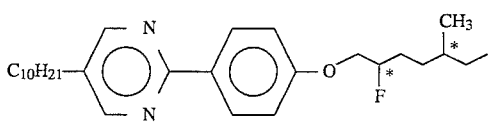

Step 1: (S)-2-Methylbutyl Bromide

In 300 ml flask were charged 100 ml of pyridine and 40 g of (S)-2-methylbutanol (98 ee%)(produced by Tokyo Chemical Industry Co., Ltd.), and the mixture was cooled to 15° C. or less. To the mixture was added 104 g of p-toluenesulfonyl chloride at that temperature over 10 minutes. The inner temperature was returned to room temperature, at which the mixture was allowed to react for 2 hours. Water was added thereto, and the reaction mixture was extracted with ethyl acetate. The extract was washed twice with a saturated sodium chloride aqueous solution and then the solvent was removed by distillation under reduced pressure to obtain 104.6 g of (S)-2-methylbutyl p-toluenesulfonate. The resulting compound was put in a 1 l flask, and 300 ml of dimethylformamide (hereinafter abbreviated as DMF) and 47.7 g of lithiumbromide (monohydrate) were added thereto, followed by allowing the mixture to react at 60° C. for 5 hours. Water was added thereto, and the reaction mixture was extracted with diethyl ether. The extract was washed twice with water, and diethyl ether was removed by distillation to obtain 60.2 g of a crude product. The crude product was purified by distillation to obtain 45.45 g (yield =66.2%) of the titled compound (b.p.: 55° C./100 mmHg). MS: 151 ($M^+$)

Step 2: (2R,5S)-2-Hydroxy-5-methylheptyl p-toluenesulfonate

In a 100 ml flask were charged 1.7 g of magnesium, 10 ml of dried tetrahydrofuran (hereinafter abbreviated as THF), and a small amount of iodine under a nitrogen atmosphere. The mixture was heated to 40° C. to activate magnesium. A few drops of a solution of 10.7 g of (S)-2-methylbutyl bromide in 50 ml of dried THF were added thereto through a dropping funnel at that temperature and, after confirming the commencement of Grignard reaction, the mixture was cooled to 25° C., and the dropwise addition was further continued over 30 minutes. After the addition, the reaction was continued at the same temperature for an additional period of 30 minutes to prepare a Grignard reagent.

In a 500 ml flask as charged a 0.1 $ML^{-1}$ dried THF solution containing 18 ml of lithium copper tetrachloride under a nitrogen atmosphere, followed by cooling to –50° C. The above prepared Grignard reagent was added thereto over 5 minutes, and the mixture was reacted at that temperature for 20 minutes. To the reaction mixture was added dropwise a solution of 8.07 g of (R)-glycidyl p-toluenesulfonate (produced by Aldrich Chemical Co., Inc.) in 70 ml of dried THF at the same temperature over 20 minutes through a dropping funnel, followed by further reacting for 1.5 hours. .The resulting reaction mixture was poured into a saturated ammonium chloride aqueous solution and extracted with diethyl ether. The extract was washed twice with a saturated sodium chloride aqueous solution, and the solvent was removed by distillation under reduced pressure to obtain 10.1 g (yield=95%) of a crude product. $[\alpha]_D^{24}$: –3.89° MS: 300 (M+) NMR ($\delta$, ppm): 0.85 (6H, m), 1.3 (7H, m), 2.05 (1H, s), 2.43 (3H, s), 3.8 (1H, m), 3.97 (2H, m), 7.35 (2H, m), 7.8 (2H, m)

The optical purity of the 2-positioned asymmetric carbon atom was 99.9 ee % as measured as an $\alpha$-methoxy-$\alpha$-trifluoromethylphenylacetic acid (hereinafter abbreviated as MTPA) derivative.

Step 3: (2R,5S)-2-Tetrahydropyranyloxy-5-methylheptyl p-toluenesulfonate

In a 50 ml egg-plant type flask were charged 1.7 g of 3,4-dihydro- 2H-pyran, 30 ml of diethyl ether, 5.0 g of (2R, 5S)-2-hydroxy- 5-methylheptyl p-toluenesulfonate, and 50 mg of p-toluenesulfonic acid, and the mixture was stirred at room temperature overnight. The resulting reaction mixture was neutralized with a saturated sodium hydrogencarbonate aqueous solution, and diethyl ether was distilled off under reduced pressure to obtain 6.5 g of a crude product.

Step 4: (2'R,5'S)-2-[4-(2'-Tetrahydropyranyloxy-5'-methyl-heptyloxy)phenyl]- 5-decylpyrimidine In a 100 ml egg-plant type flask were charged 75 ml of dried DMF, 3.0 g of 2-(4-hydroxyphenyl)-5-decylpyrimidine synthesized in a known manner, 6.0 g of (2R,5S)-2-tetrahydropyranyloxy- 5-methylheptyl p-toluenesulfonate, and 2.15 g of potassium carbonate, and the mixture was allowed to react at 80° C. for 18 hours. Water was added thereto, and the mixture was extracted with ethyl acetate. The extract was washed twice with a saturated sodium chloride aqueous solution and the solvent was removed by distillation under reduced pressure to obtain 7.0 g of a crude product. Purification by silica gel column chromatography gave 5.0 g (yield=77.5%) of the titled compound.

Step 5: (2'R,5'S)-2-[4-(2'-Hydroxy-5'-methylheptyloxy)phenyl]- 5-decylpyrimidine In a 200 ml egg-plant type flask were charged 100 ml of methanol, 5.0 g of (2'R,5'S)-2-[4-(2'-tetrahydropyranyloxy-5-methylheptyloxy)phenyl ]-5-decylpyrimidine, and 30 ml of p-toluenesulfonic acid, and the mixture was allowed to react at 40° to 45° C. for 1.5 hours. To the reaction mixture was added 1 g of potassium carbonate, and methanol was removed by distillation under reduced pressure at 50° C. or less. Water was added to the residue, and the mixture was extracted with ethyl acetate. The extract was washed twice with a saturated sodium chloride aqueous solution, and the solvent was removed by distillation to obtain 3.6 g of a crude product. Purification by silica gel column chromatography yielded 2.56 g (yield= 68.2%) of the titled compound. $[\alpha]_D^{24}$: –7.15° MS: 440 ($M^+$) NMR ($\delta$, ppm): 0.88 (9H, m), 1.3 (18H, m), 1.6 (4H, m), 2.4 (1H, s), 2.6 (2H, m), 3.92 (1H, m), 4.06 (2H, m), 7.0 (2H, m), 8.36 (2H, m), 8.58 (2H, s)

Step 6: (2'S,5'S)-2-[4-(2'-Fluoro-5'-methylheptyloxy)phenyl]- 5-decylpyrimidine

In a 50 ml flask were charged 2.4 g of (2'R,5'S)-2-[4-(2'-hydroxy- 5'-methylheptyloxy)phenyl]-5-decylpyrimidine and 24 ml of methylene chloride, and the mixture was kept at 20° to 25° C. A solution of 1.52 g of hexafluoropropene-diethylamine in 2 ml of methylene chloride was added thereto over 5 minutes, followed by allowing the mixture to react at the same temperature for 45 minutes. Water was added thereto, and the mixture was washed twice with a saturated sodium chloride aqueous solution. The solvent was removed by distillation to obtain 3.4 g of a crude product. The crude product was purified by silica gel column chromatography and then by high performance liquid chromatography (HPLC). Recrystallization from ethanol yielded 0.98 g (yield=46.5%) of the titled compound. $[\alpha]_D^{24}$: +6.05° MS: 442 ($M^+$) NMR ($\delta$, ppm): 0.9 (9H, m), 1.29 (18H, m), 1.6 (3H, m), 1.78 (2H, m), 2.6 (2H, m), 4.1-4.5 (2H, m), 4.85 (1H, m), 7.0 (2H, m), 8.36 (2H, m), 8.58 (2H, s)

The resulting compound had a melting point of 50.5° C. and monotropically showed an $S_A$ phase and an $S_C^*$ phase. The $S_C^*$-$S_A$ phase transition temperature (hereinafter referred to as Tc) was 42.0° C., and the clear point ($S_A$-I phase transition temperature) was 47.1° C. The compound had a high spontaneous polarization (Ps) of 80.1 $nC/cm^2$ as measured at –5° C. (Tc).

Because the compounds used in the present invention have a plurality of asymmetric carbon atoms, a rate of diastereomer excess (de%) was determined. The rate of diastereomer excess of the compound of Example 1 was found to be 99.2 de%.

SYNTHESIS EXAMPLE 2

Synthesis of
(S)-5-Decyl-2-[4-(3-fluoroheptyloxy)phenyl]pyrimidine

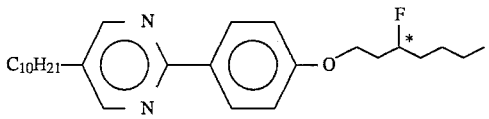

Step 1: Methyl (S)-3-Fluoroheptanoate

In a 1 l flask were added 24.45 g of methyl (R)-3-hydroxyheptanoate (98.0%ee, $[\alpha]_D^{20}=-8.71°$), which was obtained by enantioselective hydrogenation of methyl 3-ketoheptanoate according to the process described in JP-A-63-310845, and 390 ml of methylene chloride under a nitrogen atmosphere. The temperature of the mixture was kept at 5° to 10° C. A solution of 75 g of hexafluoropropene diethylamine (product of Tokyo Chemical Industry Co., Ltd.) in 225 ml of methylene chloride was added dropwise thereto at that temperature over 3 hours, followed by stirring for 2 hours. The reaction mixture was poured into 1200 ml of ice-water for liquid-liquid separation. The organic layer was washed with water, dried over magnesium sulfate, and the solvent was removed by distillation at 30° C. or lower. The residue was purified by silica gel column chromatography to obtain 12.4 g (yield: 48.5%) of the titled compound.

Incidentally, methyl (R)-3-fluoroheptanoate derived from methyl (S)-3-hydroxyheptanoate (98.8%ee, $[\alpha]_D^{20}=9.07$) was hydrolyzed to obtain 3-fluoroheptanoic acid, which was then reacted with R-(+)-1-(1-naphthyl)ethylamine to form a diastereomer. The resulting diastereomer was found to have an optical purity of 98.7%ee by liquid chromatography, indicating that no racemization took place at all. NMR (ppm): 0.92 (3H, t, J=7.2 Hz), 1.36 (4H, m), 1.66 (2H, m), 2.62 (2H, m), 3.72 (3H, s), 4.93 (1H, m)

Step 2: (S)-3-Fluoroheptanol

To a 1 l flask were added 154 ml of THF and 2.3 g of lithium aluminum hydride under a nitrogen atmosphere, and the solution was kept at 5° C. To the solution was added dropwise a solution of 9 g of methyl 3-fluoroheptanoate in 43 ml of THF over 2 hours at 5° C. After the addition, the temperature was gradually elevated up to room temperature, and the mixture was stirred for 2 hours After cooling to 5° C., 2 3 g of water, 2.3 g of a 15% sodium hydride aqueous solution, and 6.9 g of water were added thereto dropwise in this order, followed by stirring at that temperature for 15 minutes. The thus formed precipitate was removed by filtration, and the filtrate was subjected to liquid-liquid separation. The organic layer was dehydrated over potassium carbonate and the solvent was removed by distillation at 30° C. or less to obtain 8.0 g (yield=98.0%) of the titled compound. NMR (ppm): 0.92 (3H, t, J=7.2 Hz), 1.3–1.9 (8H, m), 3.81 (2H, m), 4.70 (1H, m)

Step 3: (S)-3-Fluoroheptyl Methanesulfonate

To a 100 ml flask were added 8.7 g of (S)-3-fluoroheptanol and 21.5 g of pyridine under a nitrogen atmosphere, and the solution was kept at 5° to 10° C. To the solution was added dropwise 7.5 g of methanesulfonyl chloride over 30 minutes, followed by stirring at 15° C. or less for 5 hours. The reaction mixture was poured into 200 ml of ice-water and extracted with ethyl acetate. The organic layer was washed successively with a diluted hydrochloric acid aqueous solution and water, dried over magnesium sulfate, and the solvent was removed by distillation at 30° C. or lower to obtain 12.7 g (yield=93.18%) of the titled compound. NMR (ppm): 0.92 (3H, t, J=7.1 Hz), 1.35–1.8 (6H, m), 2.03 (2H, m), 3.02 (3H, s), 4.37 (1H, t, J=6.2 Hz), 4.65 (2H, m)

Step 4: (S)-5-Decyl-2-[4-(3-fluoroheptyloxy)phenyl]pyrimidine

In a flask were added 3 g of 5-n-decyl-2-(4-hydroxy)phenylpyrimidine, 1.9 g of potassium carbonate, and 90 ml of dimethylformamide (DMF) under a nitrogen atmosphere, and the mixture was stirred at room temperature. A solution of 2.2 g of 3-fluoroheptyl methanesulfonate in 12 ml of DMF was added dropwise thereto over 15 minutes. After the addition, the reaction mixture was gradually heated up to 80° C., followed by stirring at that temperature for 4 hours. After cooling, the reaction mixture was poured into a diluted hydrochloric acid aqueous solution and extracted with ethyl acetate. The extract was washed with water, dried over magnesium sulfate, and the solvent was removed by distillation to obtain 4.47 g of a residue. The residue was purified by silica gel column chromatography and recrystallized from ethanol to obtain 2.67 g (yield=65.7%) of the titled compound. $[\alpha]_D^{20}=+10.0°$ MS: 428 (M+) NMR (ppm): 0.88 (3H, t, J=6.9 Hz), 0.93 (3H, t, J=7.1 Hz), 1.2–1.80 (24H, m), 2.09 (2H, m, J=7.5 Hz), 4.18 (2H, m), 4.77 (1H, m), 6.99 (2H, d, J=9.0 Hz), 8.36 (2H, d, J=9.0 Hz), 8.58'(2H, s)

EXAMPLE 1

A ferroelectric liquid crystal composition having a tilt angle with an electric field applied of 12° and a tilt angle during memory of 11° (both measured at 25° C.) (memory ratio: 0.92) was prepared from the compounds shown below.

Composition:

| R | R' | X | Mole % |
|---|---|---|---|
| $C_{12}H_{25}$ | $C_{10}H_{21}$ | H | 1.81 |
| $C_{12}H_{25}$ | $C_8H_{17}$ | H | 10.77 |
| $C_{10}H_{21}$ | $C_{12}H_{25}$ | H | 1.78 |
| $C_{10}H_{21}$ | $C_{11}H_{23}$ | H | 1.71 |
| $C_{10}H_{21}$ | $C_8H_{17}$ | H | 10.86 |
| $C_9H_{19}$ | $C_{10}H_{21}$ | H | 7.46 |
| $C_9H_{19}$ | $C_8H_{17}$ | H | 15.43 |
| $C_8H_{17}$ | $C_{10}H_{21}$ | H | 14.38 |
| $C_8H_{17}$ | $C_{11}H_{23}$ | H | 4.59 |
| $C_{12}H_{25}$ | ⟋⟍*⟋⟍⟋ F (R) | F | 11.18 |
| $C_{12}H_{25}$ | ⟋⟍*⟋⟍⟋ F (R) | H | 10.02 |

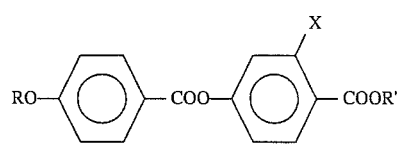

-continued

| | | | |
|---|---|---|---|
| C$_{12}$H$_{25}$ | C$_8$H$_{17}$ | F | 10.01 |

Phase transition temperatures and physical properties of the composition are shown below.

Phase Transition Temperature:

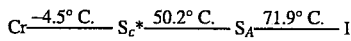
Cr $\xrightarrow{-4.5°\,C.}$ S$_c$* $\xrightarrow{50.2°\,C.}$ S$_A$ $\xrightarrow{71.9°\,C.}$ I Physical Properties:

Ps: 7.0 nC/cm$^2$ (25° C.)

Response time: 27 μsec (square wave of ±10 V/μm applied)

EXAMPLE 2

A ferroelectric liquid crystal composition having a tilt angle with an electric field applied of 13° and a tilt angle during memory of 9.0° (both measured at 21.5° C.) (memory ratio: 0.69) was prepared from the compounds shown below. Phase transition temperatures and physical properties of the composition are also shown.

Composition:

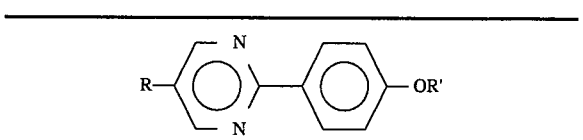

| R | R' | Mole % |
|---|---|---|
| C$_{10}$H$_{21}$ | C$_{11}$H$_{23}$ | 10.4 |
| C$_8$H$_{17}$ | C$_{11}$H$_{23}$ | 11.7 |
| C$_{10}$H$_{21}$ | C$_8$H$_{17}$ | 11.5 |
| C$_9$H$_{19}$ | C$_{10}$H$_{21}$ | 11.2 |
| C$_9$H$_{19}$ | C$_8$H$_{17}$ | 12.0 |
| C$_8$H$_{17}$ | C$_8$H$_{17}$ | 12.3 |
| C$_{12}$H$_{25}$ | (F, *, (R)) | 22.1 |

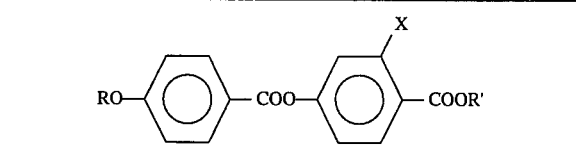

| R | R' | X | Mole % |
|---|---|---|---|
| C$_{12}$H$_{25}$ | C$_8$H$_{17}$ | F | 8.8 |

Phase Transition Point:

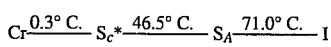
Cr $\xrightarrow{0.3°\,C.}$ S$_c$* $\xrightarrow{46.5°\,C.}$ S$_A$ $\xrightarrow{71.0°\,C.}$ I Physical Properties:

Ps: 8.5 nC/cm$^2$ (21.5° C.)

Response time: 27.2 μsec (square wave of ±10 V/μm)

EXAMPLE 3

A ferroelectric liquid crystal composition having a tilt angle with an electric field applied of 15..4° and a tilt angle during memory of 8.5° (both measured at 25° C.) (memory ratio: 0.55) was prepared from the compounds shown below. Phase transition temperatures and physical properties of the composition are also shown.

Composition:

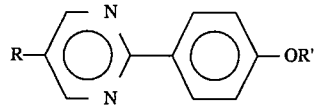

| R | R' | Mole % |
|---|---|---|
| C$_8$H$_{17}$ | C$_8$H$_{17}$ | 12.9 |
| C$_8$H$_{17}$ | C$_6$H$_{13}$ | 13.9 |
| C$_6$H$_{13}$ | C$_8$H$_{17}$ | 13.8 |
| C$_8$H$_{17}$ | C$_{10}$H$_{21}$ | 12.0 |
| C$_7$H$_{15}$ | C$_9$H$_{19}$ | 12.9 |
| C$_{10}$H$_{21}$ | (chiral group with CH$_3$, (S), *, (S), F) | 11.1 |
| C$_{12}$H$_{25}$ | (chiral group with CH$_3$, (S), *, (S), F) | 5.2 |

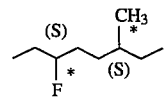

| C$_7$H$_{15}$ | C$_4$H$_9$ | 5.1 |
|---|---|---|

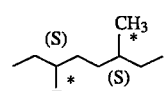

| C$_{12}$H$_{25}$ | C$_9$H$_{19}$ | 3.0 |
|---|---|---|

| | | |
|---|---|---|
| C$_8$H$_{17}$ | C$_5$H$_{11}$ | 10.1 |

Phase Transition Point:

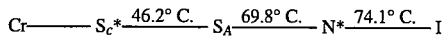
Cr $\xrightarrow{\phantom{xx}}$ S$_c$* $\xrightarrow{46.2°\,C.}$ S$_A$ $\xrightarrow{69.8°\,C.}$ N* $\xrightarrow{74.1°\,C.}$ I Physical Properties:

Ps: 11.1 nC/cm$^2$ (25° C.)

Response time: 51.6 μsec (square wave of ±10 V/μm)

EXAMPLE 4

A ferroelectric liquid crystal composition having a tilt angle with an electric field applied of 18° and a tilt angle during memory of 8.6° (both measured at 25° C.) (memory ratio: 0.48) was prepared from the compounds shown below.

Phase transition temperatures and physical properties of the composition are also shown.

Composition:

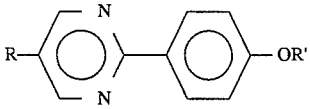

| R | R' | Mole % |
|---|---|---|
| $C_8H_{17}$ | $C_6H_{13}$ | 15.46 |
| $C_8H_{17}$ | $C_8H_{17}$ | 14.36 |
| $C_8H_{17}$ | $C_{10}H_{21}$ | 13.41 |
| $C_7H_{15}$ | $C_9H_{19}$ | 14.36 |
| $C_6H_{13}$ | $C_8H_{17}$ | 15.46 |
| $C_{10}H_{21}$ | 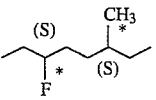 | 9.67 |
| $C_{12}H_{25}$ | 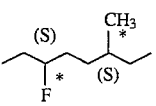 | 4.19 |
| $C_{12}H_{25}$ | 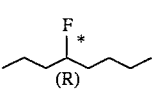 | 1.37 |

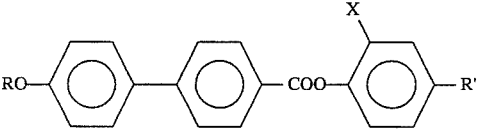

| R | R' | X | Mole % |
|---|---|---|---|
| $C_8H_{17}$ | $OC_4H_9$ | F | 9.02 |

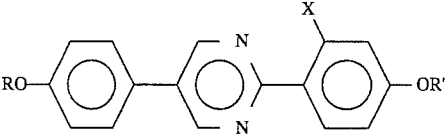

| | $C_5H_{11}$ | $C_8H_{17}$ | F | 2.70 |

Phase Transition Point:

$$Cr \xrightarrow{-10° C.} S_c^* \xrightarrow{47.5° C.} S_A \xrightarrow{65.2° C.} N^* \xrightarrow{72.5° C.} I$$

Physical Properties:

Ps: 8.3 nC/cm² (25° C.)

Response time: 71 μsec (square wave of ±10 V/μm)

COMPARATIVE EXAMPLE 1

A ferroelectric liquid crystal composition having a tilt angle with an electric field applied of 22.5° and a tilt angle during memory of 6.3° (both measured at 25° C.) (memory ratio: 0.28) was prepared from the compounds shown below. Phase transition points and physical properties of the composition are also shown.

Composition:

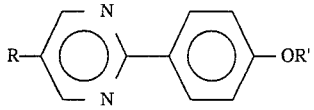

| R | R' | Mole % |
|---|---|---|
| $C_8H_{17}$ | $C_8H_{17}$ | 15.97 |
| $C_8H_{17}$ | $C_6H_{13}$ | 16.75 |
| $C_6H_{13}$ | $C_8H_{17}$ | 17.83 |
| $C_8H_{17}$ | $C_{10}H_{21}$ | 15.65 |
| $C_7H_{15}$ | $C_9H_{19}$ | 15.73 |
| $C_8H_{17}$ | 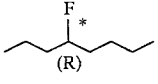 | 5.96 |
| $C_9H_{19}$ | 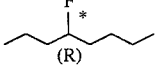 | 3.65 |
| $C_{12}H_{25}$ | 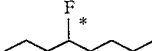 | 3.11 |
| $C_{12}H_{25}$ | 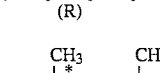 | 5.36 |

Phase Transition Point:

$$Cr \xrightarrow{-4.0° C.} S_c^* \xrightarrow{48.4° C.} S_A \xrightarrow{60.0° C.} N^* \xrightarrow{65.6° C.} I$$

Physical Properties:

Ps: 5.9 nC/cm² (25° C.)

Response time: 95 μsec (square wave of ±10 V/μm)

Although the ferroelectric liquid crystal composition obtained in Comparative Example 1 apparently has the optimum tilt angle, the memory ratio is greatly lower than that of the liquid crystal compositions obtained in the foregoing Examples. Namely, the compositions whose tilt angle with an electric field applied is controlled within a range of from 12° to 18° have a higher memory ratio than the comparative composition. On comparing the comparative composition with the composition of Example 4 having the same phase sequence, despite the fact that the latter contains tricyclic compounds which are considered to have a higher viscosity than bicyclic compounds, the latter responds at a higher speed than the former which comprises bicyclic compounds, outstandingly manifesting the effects of the tilt angle control.

COMPARATIVE EXAMPLE 2

A ferroelectric liquid crystal composition having a tilt angle with an electric field applied of 23.3° and a tilt angle during memory of 5.6° (both measured at 25° C.) was prepared from the compounds shown below. Phase transition temperatures and physical properties of the composition are shown below.

Composition:

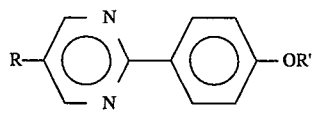

| R | R' | Mole % |
|---|---|---|
| $C_8H_{17}$ | $C_8H_{17}$ | 17.84 |
| $C_8H_{17}$ | $C_6H_{13}$ | 19.21 |
| $C_6H_{13}$ | $C_8H_{17}$ | 19.21 |
| $C_8H_{17}$ | $C_{10}H_{21}$ | 16.68 |
| $C_7H_{15}$ | $C_9H_{19}$ | 17.83 |
| $C_{12}H_{25}$ | (R)-CH$_2$CH(F)C$_4$H$_9$ * | 9.23 |

Phase Transition Point:

$$Cr \xrightarrow{1.0°\,C.} S_C^* \xrightarrow{47.7°\,C.} S_A \xrightarrow{56.0°\,C.} N^* \xrightarrow{65.5°\,C.} I$$

Physical Properties:

Ps: 2.6 nC/cm$^2$ (25° C.)

Response time: 126 μsec (square wave of ±10 V/μm)

The liquid crystal composition of Comparative Example 2 has a slow response partly because of its small spontaneous polarization. In particular, the memory ratio was as low as 0.24.

It can been seen that even if a tilt angle is widened over 22.5°, the tilt angle during memory becomes narrower, only resulting in reduction in memory ratio. The ferroelectric liquid crystal compositions obtained in the foregoing Examples have thus proved to have a very high memory ratio.

The data obtained in the foregoing Examples and Comparative Examples are tabulated below.

TABLE 1

| Liquid Crystal Composition | Tilt Angle with Electrical Field Applied (°) | Tilt Angle During Memory (°) | Memory Ratio | Response Time (μsec) | PS (nC/cm$^2$) |
|---|---|---|---|---|---|
| Example 1 | 12.0 | 11.0 | 0.92 | 27 | 7.0 |
| Example 2 | 13.0 | 9.0 | 0.69 | 27.2 | 8.5 |
| Example 3 | 15.4 | 8.5 | 0.55 | 51.6 | 11.1 |
| Example 4 | 18.0 | 8.6 | 0.48 | 71 | 8.3 |
| Comparative Example 1 | 22.5 | 6.3 | 0.28 | 95 | 5.9 |
| Comparative Example 2 | 23.3 | 5.6 | 0.24 | 126 | 2.6 |

As is apparent from Table 1, as the tilt angle with an electric field applied decreases, the tilt angle during memory increases, resulting in an increased memory ratio indicative of improved memory effects. Further, the response time becomes faster as the tilt angle with an electric field applied decreases. On the other hand, it becomes slower as the tilt angle with an electric field applied increases over 18° concurrent with a reduction in memory ratio. Further, if the tilt angle with an electric field applied reduces below 12°, spontaneous polarization becomes smaller, giving adverse influences to a response time as previously stated.

EXAMPLE 5

A ferroelectric liquid crystal composition having a tilt angle with an electric field applied of 16.5° and a tilt angle during memory of 12.2° (both measured at 25° C.) was prepared from the compounds shown below. The resulting liquid crystal composition had a Ps of 24.6 nC/cm$^2$ (25° C.) and a response time of 90 μsec with a square wave of ±10 V/μm applied. The memory ratio of the composition was extremely high as 0.74.

Composition:

RO—⟨⟩—COO—⟨⟩—R'

| R | R' | Mole % |
|---|---|---|
| $C_{10}H_{21}$ | $OC_8H_{17}$ | 13.8 |
| $C_{12}H_{25}$ | (S)-CO$_2$CH$_2$CH*CH$_2$CH(CH$_3$)$_2$ | 15.0 |
| $C_9H_{19}$ | (S)-CO$_2$CH$_2$CH*CH$_2$CH(CH$_3$)$_2$ | 16.2 |
| $C_{10}H_{21}$ | (R)-CO$_2$CH$_2$CH*C$_6$H$_{13}$ | 12.5 |

RO—⟨X⟩—⟨⟩—COO—⟨X'⟩—R'

| R | R' | X | X' | Mole % |
|---|---|---|---|---|
| $C_8H_{17}$ | $C_{10}H_{21}$ | H | F | 4.3 |

-continued

| | | | | |
|---|---|---|---|---|
| $C_8H_{17}$ | $OC_8H_{17}$ | H | F | 7.4 |
| $C_8H_{17}$ | (S)-CO$_2$CH$_2$CH*CH$_2$CH(CH$_3$)$_2$ | F | H | 7.7 |
| $C_8H_{17}$ | (R)-OCH$_2$CH*CH$_2$CH(CH$_3$)$_2$ | H | F | 6.9 |

-continued

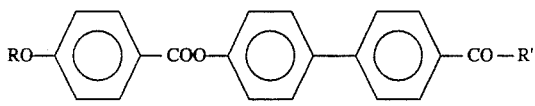

| R | R' | Mole % |
|---|---|---|
| $C_8H_{17}$ | 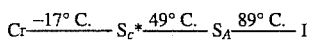 (S) | 16.2 |

Phase Transition Point:

$$Cr \xrightarrow{-17° C.} S_c^* \xrightarrow{49° C.} S_A \xrightarrow{89° C.} I$$

EXAMPLE 6

Basic liquid crystal composition (A) was prepared from the compounds shown below. Basic composition (A) had a Ps of 12.5 nC/cm², a tilt angle with an electric field applied of 21.8°, and a tilt angle during memory of 5.7° (all measured at 25° C.) (memory ratio: 0.26). The response time was 85 µsec on application of a square wave of ±10 V/µm.
Composition:

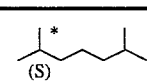

| R | R' | Mole % |
|---|---|---|
| $C_8H_{17}$ | $C_{11}H_{23}$ | 10.0 |
| $C_{10}H_{21}$ | $C_{11}H_{23}$ | 10.1 |
| $C_{10}H_{21}$ | $C_8H_{17}$ | 11.4 |
| $C_9H_{19}$ | $C_8H_{17}$ | 10.9 |
| $C_8H_{17}$ | $C_8H_{17}$ | 11.7 |
| $C_9H_{19}$ | $C_{10}H_{21}$ | 10.8 |
| $C_{12}H_{25}$ | 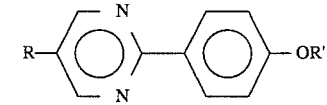 (R) | 23.7 |

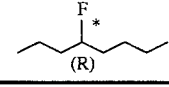

| $C_8H_{17}$ | $C_8H_{17}$ | 11.4 |

To basic composition (A) was added 3.9 mole % of 3-fluoro-4-octyloxycarbonylphenyl 4-dodecyloxyphenylcarboxylate to prepare a ferroelectric liquid crystal composition. The resulting composition has a Ps of 10.4 nC/cm², a tilt angle with an electric field applied of 17.1°, which was narrower than that of basic composition (A), and a tilt angle during memory of 8.9° (all measured at 25° C.). The composition exhibited a reduced response time of 51 µsec with a square wave of ±10 V/µm applied and an improved memory ratio of 0.52.

EXAMPLE 7

A ferroelectric liquid crystal composition was prepared from 91.9 mole % of basic liquid crystal composition (A) obtained in Example 6 and 8.1 mole % of 3-fluoro-4-octyloxycarbonylphenyl 4-dodecyloxyphenylcarboxylate. The resulting composition turned to an isotropic phase at 70° C. and passed from an $S_c^*$ phase into an $S_A$ phase at 50° C. by phase transition. The Ps was 6.4 nC/cm², the tilt angle with an electric field applied was 12°, and the tilt angle during memory was 8.0° (all measured at 25° C.). The composition had an extremely shortened response time of 20 µsec with a square wave of ±10 V/µm applied and an improved memory ratio of 0.67.

It is thus demonstrated that addition of an ester compound included in compounds of formula (I) to a liquid crystal composition brings about speed-up of response and makes the tilt angle narrower to increase the memory ratio. Ferroelectric liquid crystal compositions containing such compounds respond in a very short time and provide a high contrast ratio.

EXAMPLE 8

Basic liquid crystal composition (B) was prepared from the compounds shown below. Basic composition (B) showed a transition from an $S_c^*$ phase to an $S_A$ phase at 66.5° C. and became an isotropic liquid at 73.6° C. Basic composition (B) had a tilt angle with an electric field applied of 18° (40° C.). The response time was 40 µsec on application of a square wave of ±10 V/µm.

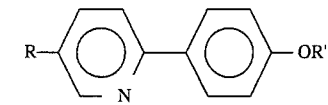

| R | R' | Mole % |
|---|---|---|
| $C_{12}H_{25}$ | $C_8H_{17}$ | 12.6 |
| $C_{11}H_{23}$ | $C_9H_{19}$ | 12.7 |
| $C_{11}H_{23}$ | $C_7H_{15}$ | 12.6 |
| $C_{10}H_{21}$ | $C_8H_{17}$ | 12.8 |
| $C_{10}H_{21}$ | $C_6H_{13}$ | 12.6 |
| $C_9H_{19}$ | $C_7H_{15}$ | 12.7 |
| $C_{12}H_{25}$ | 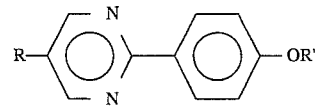 (R) | 23.9 |

To basic composition (B) was added 4.7 mole % of 4-decyloxy- 4'-octyloxycarbonylbiphenyl to obtain a ferroelectric liquid crystal composition. The resulting composition had a Tc ($S_c^*$-$S_A$ transition temperature) of 64.5° C., a tilt angle with an electric field applied of 14.5° and a tilt angle during memory of 12.0° (both measured at 40° C.) (memory ratio: 0.83). The composition had a response time of 31 µsec with a square wave of ±10 V/µm applied.

EXAMPLE 9

To basic composition (B) prepared in Example 8 was added 5.8 mole % of 3-fluoro-4-octyloxycarbonylphenyl 4-dodecyloxyphenylcarboxylate to obtain a ferroelectric liquid crystal composition. The resulting composition had a Tc of 58 4° C., a tilt angle with an electric field applied of 13°, and a tilt angle during memory of 11.0° (both measured at 40° C.) (memory ratio: 0.85). The composition had a response time of 35 μsec with a square wave of ±10 V/μm applied.

EXAMPLE 10

To basic composition (B) prepared in Example 8 was added 5.3 mole % of 4-octylcarbonylphenyl 4-decyloxyphenylcarboxylate to obtain a ferroelectric liquid crystal composition. The resulting composition had a Tc of 62.3° C., a tilt angle with an electric field applied of 15°, and a tilt angle during memory of 10.8° (both measured at 40° C.) (memory ratio: 0.72). The composition had a response time of 33 μsec with a square wave of ±10 V/μm applied.

EXAMPLE 11

To basic composition (B.) prepared in Example 8 was added 5.8 mole % of an optically active ester compound having formula shown below to obtain a ferroelectric liquid crystal composition.

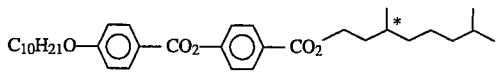

The resulting composition had a Tc of 58.4° C., a tilt angle with an electric field applied of 13°, and a tilt angle during memory of 10.6° (both measured at 40° C.) (memory ratio: 0.82). The composition had a response time of 33 μsec with a square wave of ±10 V/μm applied.

COMPARATIVE EXAMPLE 3

To basic composition (B) prepared in Example 8 was added 5.1 mole % of 4-octyloxyphenyl 4-decyloxyphenylcarboxylate to obtain a ferroelectric liquid crystal composition. The resulting composition had a Tc of 65.7° C., a tilt angle with an electric field applied of 18° (40° C.). The composition had a response time of 38 μsec with a square wave of ±10 V/μm applied.

As is obvious from the results of Examples 8 to 11 and Comparative Example 3, addition of a bicyclic compound having a carbonyl group at the terminal thereof to a liquid crystal composition makes the tilt angle narrower, whereas addition of an ester compound having its ester group in the center of the core thereof brings about no substantial change. It is thus seen that the carbonyl group at the core terminal exerts a great influence on making the tilt angle narrower.

EXAMPLE 12

Basic liquid crystal composition (C) was prepared from the following compounds. Basic composition (C) showed a transition from an $S_c^*$ phase to an $S_A$ phase at 54 6° C., a transition from an $S_A$ phase to an $N^*$ phase at 67.0° C. and became an isotropic liquid at 75.0° C. The tilt angle with an electric field applied was 20.8°, the Ps was 12.5 nC/cm² (both measured at 25° C.), and the response time on application of a square wave of ±10 V/μm was 143 μsec.

Composition:

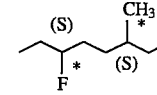

| R | R' | Mole % |
|---|----|--------|
| $C_8H_{17}$ | $C_8H_{17}$ | 12.9 |
| $C_8H_{17}$ | $C_6H_{13}$ | 13.9 |
| $C_6H_{13}$ | $C_8H_{17}$ | 13.8 |
| $C_8H_{17}$ | $C_{10}H_{21}$ | 12.0 |
| $C_7H_{15}$ | $C_9H_{19}$ | 12.9 |
| $C_{10}H_{21}$ | (S)-CH₃, *-F, (S) branched chain | 11.1 |
| $C_{12}H_{25}$ | (S)-CH₃, *-F, (S) branched chain | 5.2 |

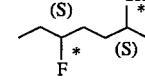

| R | R' | Mole % |
|---|----|--------|
| $C_8H_{17}$ | $C_5H_{11}$ | 10.1 |

| R | R' | Mole % |
|---|----|--------|
| $C_7H_{15}$ | $C_4H_9$ | 5.1 |

To basic composition (C) was added 3.0 mole % of nonyl 4-(5-dodecyl- 2-pyrimidyl)phenylcarboxylate to obtain a ferroelectric liquid crystal composition. The resulting composition showed a transition from an $S_c^*$ phase to an $S_A$ phase at 46.2° C., a transition from an $S_A$ phase to an $N^*$ phase at 69.8° C., and became an isotropic liquid at 74.1° C. The tilt angle with an electric field applied was 15.4°, the tilt angle during memory was 11.7° (both measured at 25° C.) (memory ratio: 0.76), the Ps was 11.1 nC/cm² (25° C.), and the response time on application of a square wave of ±10 V/μm was 51.6 μsec.

It can be seen from these results that addition of a small amount of nonyl 4-(5-dodecyloxy-2-pyrimidyl)phenylcarboxylate included in formula (I) increases the rate of response nearly three times.

EXAMPLE 13

A ferroelectric liquid crystal composition was prepared from the following compounds. The composition had a tilt angle with an electric field applied of 15.8° and a tilt angle during memory of 10.9° (both measured at 25° C.) (memory ratio: 0.69). The Ps of the composition was 12.3 nC/cm² (25° C.), and the response time on application of a square wave of ±10 V/μm was as short as 21.0 μsec.

Composition:

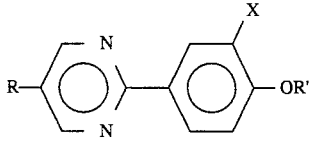

| R | R' | X | Mole % |
|---|---|---|---|
| $C_{12}H_{25}$ | $C_8H_{17}$ | H | 1.9 |
| $C_{12}H_{25}$ | $C_{10}H_{21}$ | H | 1.9 |
| $C_{10}H_{21}$ | $C_{12}H_{25}$ | H | 2.4 |
| $C_{11}H_{23}$ | $C_9H_{19}$ | H | 3.2 |
| $C_{10}H_{21}$ | $C_{11}H_{23}$ | H | 3.1 |
| $C_{10}H_{21}$ | 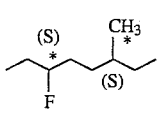 | H | 10.5 |
| $C_{12}H_{25}$ | 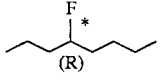 | H | 1.5 |
| $C_{12}H_{25}$ | 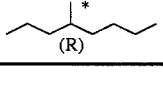 | F | 2.0 |

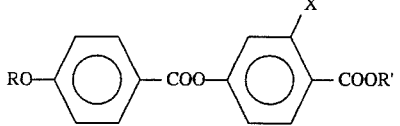

| R | R' | X | Mole % |
|---|---|---|---|
| $C_{12}H_{25}$ | $C_8H_{17}$ | F | 11.01 |

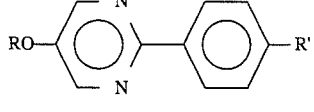

| R | R' | Mole % |
|---|---|---|
| $C_{10}H_{21}$ | $C_{10}H_{21}$ | 6.3 |
| $C_9H_{19}$ | $C_9H_{19}$ | 6.7 |
| $C_8H_{17}$ | $C_6H_{13}$ | 9.6 |
| $C_9H_{19}$ | $C_6H_{13}$ | 11.5 |
| $C_8H_{17}$ | $C_7H_{15}$ | 6.8 |
| $C_9H_{19}$ | $C_7H_{15}$ | 7.3 |
| $C_9H_{19}$ | $C_8H_{17}$ | 8.7 |
| $C_9H_{19}$ | $C_{10}H_{21}$ | 5.3 |

Phase transition temperature of the ferroelectric liquid crystal composition were as, follows.

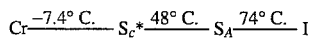

EXAMPLE 14

To basic composition (A) prepared in Example 6 was added 3.9 mole % of 3-fluoro-4-octyloxycarbonylphenyl 4-dodecyloxyphenylcarboxylate to obtain a ferroelectric liquid crystal composition. The resulting composition had a Ps of 10.4 nC/cm² (25° C.) and an improved response time of 51 μsec with a square wave of ±10 V/μm applied. The tilt angle with an electric field applied was reduced to 17.1°, and the tilt angle during memory was 8.9° (both measured at 25° C.), giving an improved memory ratio of 0.52.

EXAMPLE 15

Basic liquid crystal composition (D) was prepared from the following compounds. Basic composition (D) showed a transition from an $S_c^*$ phase to an $S_A$ phase at 54.6° C., a transition from an $S_A$ phase to an $N^*$ phase at 67.0° C., and became an isotropic liquid at 75.0° C. The tilt angle with an electric field applied was 20.8°, the Ps was 12.5 nC/cm² (both measured at 25° C.), and the response time on application of a square wave of ±10 V/μm was 143 μsec.

Composition:

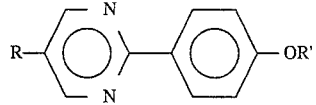

| R | R' | Mole % |
|---|---|---|
| $C_8H_{17}$ | $C_8H_{17}$ | 13.6 |
| $C_8H_{17}$ | $C_6H_{13}$ | 14.6 |
| $C_6H_{13}$ | $C_8H_{17}$ | 14.6 |
| $C_8H_{17}$ | $C_{10}H_{21}$ | 12.6 |
| $C_7H_{15}$ | $C_9H_{19}$ | 13.5 |
| $C_{10}H_{21}$ | 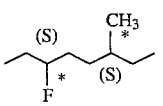 | 10.9 |
| $C_{12}H_{25}$ | 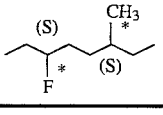 | 5.1 |

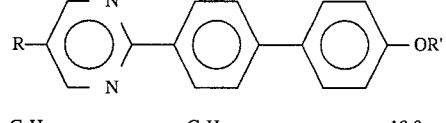

| $C_8H_{17}$ | $C_5H_{11}$ | 10.0 |

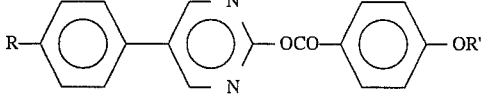

| $C_7H_{15}$ | $C_4H_9$ | 5.1 |

To basic composition (D) was added 3.0 mole % of nonyl 4-(5-dodecyl- 2-pyrimidyl)phenylcarboxylate to obtain a ferroelectric liquid crystal composition. The resulting composition showed a transition from an $S_c^*$ phase to an $S_A$ phase at 46.2° C., a transition from an $S_A$ phase to an $N^*$ phase at 69.8° C., and became an isotropic liquid at 74.1° C. The tilt angle with an electric field applied was 15.4°, the tilt angle during memory was 11.7° (both measured at 25° C.) (memory ratio: 0.76), the Ps was 11.1 nC/cm² (25° C.), and the response time on application of a square wave of ±10 V/μm was 51.6 μsec.

The ferroelectric liquid crystal composition according to the present invention has its tilt angle controlled within a range of from 12° to 18° with an electric field applied and within a range of from 8° to 15° during memory, thereby achieving a high memory ratio. Such a narrow tilt angle also brings about a fast response. Accordingly, the ferroelectric liquid crystal composition of the present invention provides electrooptical elements of fast response and high contrast.

While the invention has been described in detail and with reference to specific examples thereof, it will be apparent to one skilled in the art that various changes and modifications can be made therein without departing from the spirit and scope thereof.

What is claimed is:

1. A ferroelectric liquid crystal composition comprising at least one liquid crystal compound represented by formula (I), an optically active compound represented by formula (II), and an achiral liquid crystal compound represented by formula (III):

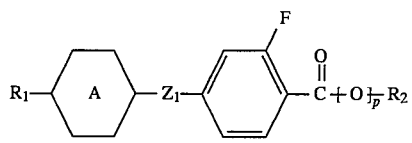

wherein $R_1$ represents a straight chain alkyl or alkoxy group having from 6 to 14 carbon atoms;

$R_2$ represents a straight chain or branched alkyl group having from 6 to 14 carbon atoms which may contain an asymmetric carbon atom;

ring A represents

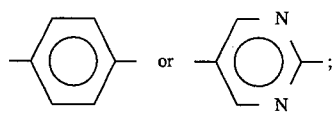

$Z_1$ represents a single bond or —COO—; and p represents 1 or 0; said composition exhibiting a chiral smectic C phase, in which the tilt angle with an electric field applied thereto is from 12° to 18° and the tilt angle during memory is from 8° to 15°,

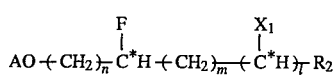

wherein

A represents

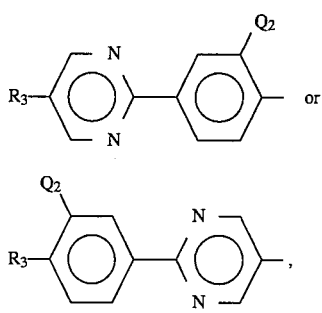

wherein $R_3$ represents a straight chain alkyl group having from 8 to 12 carbon atoms, and $Q_2$ represents a hydrogen atom or a flourine atom;

$R_2$ represents a straight chain alkyl group having from 2 to 8 carbon atoms;

$X_1$ represents a flourine atom or a methyl group;

n represents 1 or 2;

m represents an integer of from 0 to 3;

l represents 0 or 1; and

C* represents an assymetric carbon atom,

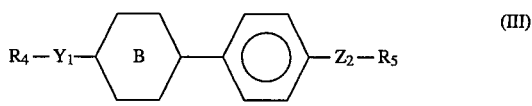

wherein ring B represents

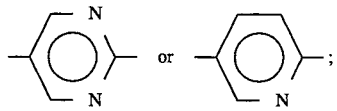

$R_4$ and $R_5$ each represent a straight chain or branched alkyl group having from 6 to 14 carbon atoms; and $Y_1$ and $Z_2$ each represent a single bond or —O—.

2. A ferroelectric liquid crystal composition as claimed in claim 1, wherein said composition shows a phase sequence of isotropic liquid phase-chiral nematic phase-smectic A phase-chiral smectic C phase on cooling.

3. A ferroelectric liquid crystal composition as claimed in claim 1, wherein said composition shows a phase sequence of isotropic liquid phase-smectic A phase-chiral smectic C phase on cooling.

4. A ferroelectric liquid crystal composition as claimed in claim 1, wherein said liquid crystal compound of formula (I), optically active compound of formula (II), and achiral liquid crystal compound of formula (III) are present in an amount of from 2 to 15 mole %, from 2 to 30 mole %, and from 55 to 80 mole %, respectively.

5. A ferroelectric liquid crystal composition as claimed in claim 1, wherein said composition is for simple matrix driving.

6. A liquid crystal display device comprising a cell composed of a pair of substrates having a transparent electrode at a cell gap of not more than 10 μm having supported therebetween a ferroelectric liquid crystal composition, said composition comprising at least one liquid crystal compound represented by formula (1), an optically active compound represented by formula (II), and an achiral liquid crystal compound represented by formula (III):

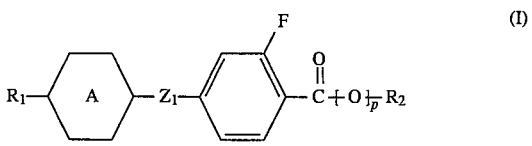

wherein $R_1$ represents a straight chain alkyl or alkoxy group having from 6 to 14 carbon atoms;

$R_2$ represents a straight chain or branched alkyl group having from 6 to 14 carbon atoms which may contain an asymmetric carbon atom;

ring A represents

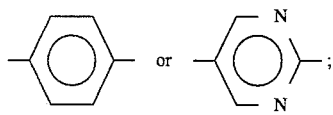

$Z_1$ represents a single bond or —COO—; and p represents 1 or 0; said composition exhibiting a chiral smectic C phase, in which the tilt angle with an electric field applied thereto is from 12° to 18° and the tilt angle during memory is from 8° to 15°,

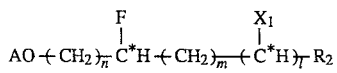

wherein

A represents

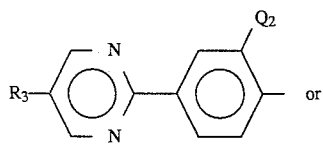

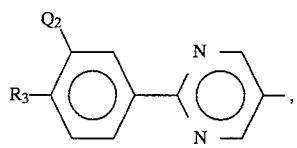

wherein $R_3$ represents a straight chain alkyl group having from 8 to 12 carbon atoms, and $Q_2$ represents a hydrogen atom or a fluorine atom;

$R_2$ represents a straight chain alkyl group having from 2 to 8 carbon atoms;

$X_1$ represents a fluorine atom or a methyl group;

n represents 1 or 2;

m represents an integer of from 0 to 3;

l represents 0 or 1; and

C* represents an asymmetric carbon atom.

wherein ring B represents

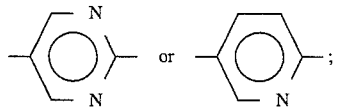

$R_4$ and $R_5$ each represent a straight chain or branched alkyl group having from 6 to 14 carbon atoms; and $Y_1$ and $Z_2$ each represent a single bond or —O—.

* * * * *